(12) United States Patent
Wei et al.

(10) Patent No.: US 12,004,187 B2
(45) Date of Patent: *Jun. 4, 2024

(54) METHOD AND APPARATUS FOR PERFORMING REPETITION TRANSMISSIONS IN WIRELESS COMMUNICATION SYSTEMS

(71) Applicant: FG Innovation Company Limited, Tuen Mun (HK)

(72) Inventors: Chia-Hung Wei, Taipei (TW); Heng-Li Chin, Taipei (TW); Hsin-Hsi Tsai, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,520

(22) Filed: May 6, 2022

(65) Prior Publication Data
US 2022/0264545 A1 Aug. 18, 2022

Related U.S. Application Data

(63) Continuation of application No. 16/898,429, filed on Jun. 10, 2020, now Pat. No. 11,356,995.
(Continued)

(51) Int. Cl.
*H04W 4/00* (2018.01)
*H04L 1/18* (2023.01)
*H04W 72/23* (2023.01)

(52) U.S. Cl.
CPC ............... *H04W 72/23* (2023.01); *H04L 1/18* (2013.01)

(58) Field of Classification Search
None
See application file for complete search history.

(56) References Cited

U.S. PATENT DOCUMENTS 11,356,995 B2 * 6/2022 Wei ............... H04W 72/23
2016/0192385 A1 6/2016 Tooher et al.
(Continued)

FOREIGN PATENT DOCUMENTS

CN 105409138 A 3/2016
CN 107836093 A 3/2018
(Continued)

OTHER PUBLICATIONS

3rd Generation Partnership Project; Technical Specification Group Radio Access Network; NR; Radio Resource Control (RRC) protocol specification (Release 15) 3GPP TS 38.331 V15.4.0 Jan. 14, 2019(Jan. 14, 2019); the whole document.
(Continued)

*Primary Examiner* — Clemence S Han
(74) *Attorney, Agent, or Firm* — ScienBiziP, P.C.

(57) ABSTRACT

A method performed by a UE for repetition transmissions is provided. The method includes receiving DCI scheduling an uplink transmission; identifying a DCI format of the DCI; selecting, from a plurality of sets of preconfigured values, a set of preconfigured values that is mapped to the DCI format; and determining a number of times the uplink transmission is required to be repeated from the selected set of preconfigured values. A UE applying the same method is also provided.

12 Claims, 8 Drawing Sheets

Related U.S. Application Data

(60) Provisional application No. 62/869,545, filed on Jul. 1, 2019.

(56) References Cited

U.S. PATENT DOCUMENTS

| | | | |
|---|---|---|---|
| 2019/0053227 A1 | 2/2019 | Huang et al. | |
| 2019/0149365 A1* | 5/2019 | Chatterjee | H04W 80/02 |
| | | | 370/329 |
| 2019/0159213 A1* | 5/2019 | Baldemair | H04L 5/0094 |
| 2019/0313386 A1* | 10/2019 | Hwang | H04W 72/23 |
| 2020/0337029 A1* | 10/2020 | Yi | H04L 5/0053 |
| 2020/0404629 A1 | 12/2020 | Wang et al. | |
| 2021/0045139 A1* | 2/2021 | Takeda | H04L 5/0053 |
| 2021/0314982 A1* | 10/2021 | Panteleev | H04L 5/0053 |
| 2022/0103294 A1* | 3/2022 | Ying | H04W 76/20 |
| 2022/0159706 A1* | 5/2022 | Panteleev | H04L 1/08 |
| 2022/0210824 A1* | 6/2022 | Ying | H04W 76/20 |
| 2022/0248453 A1* | 8/2022 | Aiba | H04L 5/0094 |

FOREIGN PATENT DOCUMENTS

| | | |
|---|---|---|
| CN | 108293242 A | 7/2018 |
| CN | 109952804 A | 6/2019 |
| TW | 201902281 A | 1/2019 |
| TW | 201911924 A | 3/2019 |
| TW | 201918047 A | 5/2019 |
| WO | 2018165347 A1 | 9/2018 |
| WO | 2018175596 A1 | 9/2018 |
| WO | 2019062640 A1 | 4/2019 |

OTHER PUBLICATIONS

Non-Final Rejection dated Nov. 5, 2021 for U.S. Appl. No. 16/898,429 which is the parent application of the instant application.

Notice of Allowance dated Feb. 24, 2022 for U.S. Appl. No. 16/898,429 which is the parent application of the instant application.

3GPP TS 38.212, "3rd Generation Partnership Project; Technical Specification Group Radio Access Network; NR; Multiplexing and channel coding (Release 16)", V16.5.0 (Mar. 2021).

3GPP TS 38.213, "3rd Generation Partnership Project; Technical Specification Group Radio Access Network; NR; Physical layer procedures for control (Release 15)", V15.13.0 (Mar. 2021).

3GPP TS 38.214, "3rd Generation Partnership Project; Technical Specification Group Radio Access Network; NR; Physical layer procedures for data (Release 15)", V15.12.0 (Mar. 2021).

Nokia, Nokia Shanghai Bell, "Summary of Tuesday offline discussion on PUSCH enhancements for NR eURLLC (AI 7.2.6.3)", 3GPP TSG-RAN WG1 Meeting #97 Reno, Nevada, US, May 13-17, 2019, R1-1907766, p. 15-p. 16.

Panasonic, "On PUSCH enhancements for NR URLLC", 3GPP TSG RAN WG1 #96bis Xi'an, China, Apr. 8-12, 2019, R1-1904188, p. 2-p. 3, p. 4-p. 5.

NTT Docomo, Inc, "Summary of 7.2.6.3 Enhanced configured grant PUSCH transmissions", R1-1903341, 3GPP TSG RAN WG1 Meeting #96, Athens, Greece, Feb. 25-Mar. 1, 2019 (Feb. 27, 2019).

* cited by examiner

METHOD AND APPARATUS FOR PERFORMING REPETITION TRANSMISSIONS IN WIRELESS COMMUNICATION SYSTEMS

CROSS-REFERENCE TO RELATED APPLICATION(S)

The present application is a continuation application of U.S. patent application Ser. No. 16/898,429, filed on Jun. 10, 2020, entitled "METHOD AND APPARATUS FOR PERFORMING REPETITION TRANSMISSIONS IN WIRELESS COMMUNICATION SYSTEM," which claims the benefit of and priority to U.S. Provisional Patent Application Ser. No. 62/869,545, filed on Jul. 1, 2019, entitled "Configuration of Enhanced Repetition of PUSCH Transmission." The content(s) of all above-named application(s) are fully incorporated herein by reference for all purposes.

FIELD

The present disclosure generally relates to wireless communications, and more particularly, to methods and apparatuses for performing repetition of transmissions in a wireless communication system.

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in the art.

SUMMARY

The present disclosure is directed to methods and apparatuses for performing repetition transmissions in a wireless communication system.

According to a first aspect of the present disclosure, a method performed by a User Equipment (UE) is provided. The method includes the UE receiving a Radio Resource Control (RRC) configuration including a plurality of repetition lists that are associated with a plurality of Downlink Control Information (DCI) formats. Each of the plurality of repetition lists includes a plurality of values, and each of the plurality of values indicates the number of repetitions for a Physical Uplink Shared Channel (PUSCH) transmission. The method further includes the UE receiving DCI having a particular DCI format for scheduling the PUSCH transmission. The DCI includes an indicator indicating one of the plurality of values included in one of the plurality of repetition lists. The one of the plurality of repetition lists is associated with the particular DCI format. The method further includes the UE performing the PUSCH transmission for a number of times, where the number of times is determined by the one of the plurality of values.

According to a second aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to receive an RRC configuration including a plurality of repetition lists that are associated with a plurality of DCI formats. Each of the plurality of repetition lists includes a plurality of values, and each of the plurality of values indicates the number of repetitions for a PUSCH transmission. The processor is further configured to execute the computer-executable instructions to receive DCI having a particular DCI format for scheduling the PUSCH transmission. The DCI includes an indicator indicating one of the plurality of values included in one of the plurality of repetition lists. The one of the plurality of repetition lists is associated with the particular DCI format. The processor is further configured to execute the computer-executable instructions to perform the PUSCH transmission for a number of times, where the number of times is determined by the one of the plurality of values.

According to a third aspect of the present disclosure, a method performed by a User Equipment (UE) for repetition transmissions is provided. The method includes receiving Downlink Control Information (DCI) scheduling an uplink transmission; identifying a DCI format of the DCI; selecting, from a plurality of sets of preconfigured values, a set of preconfigured values that is mapped to the DCI format; and determining a number of times the uplink transmission is required to be repeated from the selected set of preconfigured values.

In some implementations of the third aspect of the present disclosure, determining the number of times the uplink transmission is required to be repeated includes selecting, from the selected set of preconfigured values, a preconfigured value indicated by the DCI; and determining the number of times the uplink transmission is required to be repeated according to the selected preconfigured value.

In some implementations of the third aspect of the present disclosure, each of the plurality of sets of preconfigured values is mapped to a respective DCI format.

In some implementations of the third aspect of the present disclosure, the method further includes receiving a Radio Resource Control (RRC) configuration that indicates a number of sets of preconfigured values in the plurality of sets of preconfigured values, wherein the RRC configuration includes a Bandwidth Part (BWP)-specific configuration that is dedicated to a specific BWP.

In some implementations of the third aspect of the present disclosure, the method further includes determining whether to apply a non-slot-based repetition scheme to perform the uplink transmission according to the DCI format and the RRC configuration.

In some implementations of the third aspect of the present disclosure, each of the plurality of sets of preconfigured values is included in a respective Time Domain Resource Allocation (TDRA) list.

In some implementations of the third aspect of the present disclosure, the uplink transmission includes a Physical Uplink Shared Channel (PUSCH) transmission.

According to a fourth aspect of the present disclosure, a User Equipment (UE) for repetition transmissions is provided. The UE includes one or more non-transitory computer-readable media having computer-executable instructions embodied thereon and at least one processor coupled to the one or more non-transitory computer-readable media. The at least one processor is configured to execute the computer-executable instructions to perform operations including receiving Downlink Control Information (DCI) scheduling an uplink transmission; identifying a DCI format of the DCI; selecting, from a plurality of sets of preconfigured values, a set of preconfigured values that is mapped to the DCI format; and determining a number of times the uplink transmission is required to be repeated from the selected set of preconfigured values.

In some implementations of the fourth aspect of the present disclosure, determining the number of times the uplink transmission is required to be repeated includes selecting, from the selected set of preconfigured values, a preconfigured value indicated by the DCI; and determining the number of times the uplink transmission is required to be repeated according to the selected preconfigured value.

In some implementations of the fourth aspect of the present disclosure, each of the plurality of sets of preconfigured values is mapped to a respective DCI format.

In some implementations of the fourth aspect of the present disclosure, the operations further include receiving a Radio Resource Control (RRC) configuration that indicates a number of sets of preconfigured values in the plurality of sets of preconfigured values, wherein the RRC configuration includes a Bandwidth Part (BWP)-specific configuration that is dedicated to a specific BWP.

In some implementations of the fourth aspect of the present disclosure, the operations further include determining whether to apply a non-slot-based repetition scheme to perform the uplink transmission according to the DCI format and the RRC configuration.

In some implementations of the fourth aspect of the present disclosure, each of the plurality of sets of preconfigured values is included in a respective Time Domain Resource Allocation (TDRA) list.

In some implementations of the fourth aspect of the present disclosure, the uplink transmission includes a Physical Uplink Shared Channel (PUSCH) transmission.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
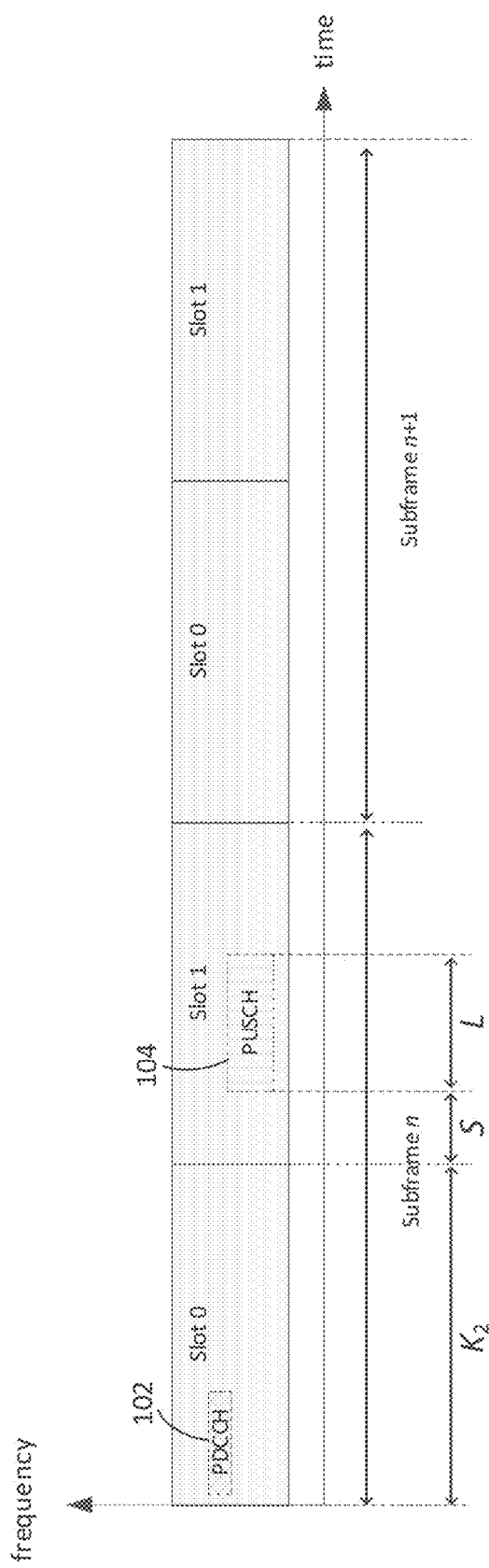
FIG. 1 is a diagram illustrating a PUSCH transmission scheduled by a Physical Downlink Control Channel (PDCCH), in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may differ in other respects, and thus shall not be narrowly confined to what is shown in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, a LTE-Advanced (LTE-A) system, or a LTE-Advanced Pro system) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UNITS, a Base Station Controller (BSC) as in the Global System for Mobile communications (GSM)/GSM EDGE Radio Access Network (GERAN), an ng-eNB as in an E-UTRA BS in connection with the 5GC, a next generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present disclosure should not be limited to the above mentioned protocols.

The BS may be operable to provide radio coverage to a specific geographical area using a plurality of cells being included the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and optionally Uplink (UL) resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as a Special Cell (SpCell). PCell may refer to the SpCell of an MCG. The Primary Secondary Cell (PSCell) may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as eMBB, mMTC and URLLC, while fulfilling high reliability, high data rate and low latency requirements. The orthogonal frequency-division multiplexing (OFDM) technology as agreed in $3^{rd}$ Generation Partnership Project (3GPP) may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, a DL transmission data, a guard period, and a UL transmission data should at least be included, where the respective portions of the DL transmission data, the guard period, the UL transmission data should also be configurable, for example, based on the network dynamics of NR. In addition, sidelink resource may also be provided in an NR frame to support ProSe services.

In the 3GPP Release 16 (Rel-16) NR wireless communication system, a UE may be configured to periodically, discontinuously, or continuously monitor a PDCCH in the time domain and find a possible dynamic UL grant (scheduling) that is scheduled by a gNB via the PDCCH. For example, the UL grant may be received on (UE-specific) DCI with Cyclic Redundancy Check (CRC) bit(s) scrambled by a UE-specific Radio Network Temporary Identifier (RNTI) (e.g., Cell-RNTI (C-RNTI)). The DCI may be found by the UE on the PDCCH via blind decoding. The DCI may indicate a UL grant of a Physical Uplink Shared Channel (PUSCH). For example, the DCI may indicate the time and frequency locations of the PUSCH. Once the UL grant is obtained, the UE may perform the corresponding UL data transmission on the PUSCH (or "PUSCH transmission") by utilizing the UL grant. For example, the PUSCH transmission may include transmitting a Transport Block (TB) by the UE. It is noted that the term "PUSCH transmission(s)/repetition(s)," the term "repetition(s) of a PUSCH transmission," the term "TB transmission(s)/repetition(s)" and the term "repetition(s) of a TB transmission" may be interchangeable in some implementations of the present disclosure.

In some implementations, a PUSCH transmission(s) may be dynamically scheduled by a BS (e.g., a gNB) via a UL grant in the DCI, or scheduled by a configured grant of Type 1 or Type 2.

FIG. 1 is a diagram illustrating a PUSCH transmission scheduled by a PDCCH, in accordance with an implementation of the present disclosure. It should be noted that even though each subframe (e.g., the subframe n and the subframe n+1) includes two slots (e.g., the slot 0 and the slot 1) in the example implementation illustrated in FIG. 1, each subframe may include any number of slots in other implementations of the present disclosure. For example, the number of slots in each subframe may be determined based on a configuration of numerology. In addition, a fixed number of symbols may be contained in each slot.

As shown in FIG. 1, three parameters, $K_2$, S and L, may be used to determine the time location and duration of a PUSCH 104 scheduled by a PDCCH 102. For example, the parameter $K_2$ may be used to determine a slot offset between the slot (e.g., the slot 0) containing the PDCCH (e.g., the PDCCH 102) carrying the DCI that indicates a PUSCH resource assignment and the slot (e.g., the slot 1) containing the PUSCH resource assigned by the DCI (e.g., the PUSCH 104). The parameter S may be an index of the starting symbol of the scheduled PUSCH (e.g., the PUSCH 104) in the slot (e.g., the slot 1) indicated by $K_2$. The parameter L may be the number of consecutive symbols of the scheduled PUSCH (e.g., the PUSCH 104) in the indicated slot (e.g., the slot 1).

In some implementations, the values of $K_2$, S and L for each dynamic grant from a BS may be derived by a UE based on a configuration for the numerology of a BWP and/or an index (e.g., a time domain resource assignment) contained in the DCI.

Figure 2:
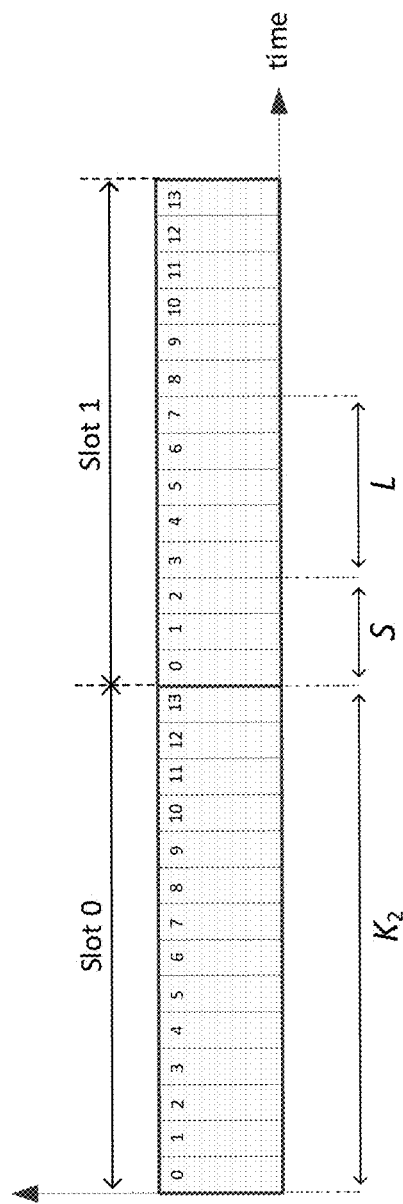
FIG. 2 is diagram illustrating a PUSCH transmission scheduled by a PDCCH, in accordance with an implementation of the present disclosure.

FIG. 2 is diagram illustrating a PUSCH scheduled by a PDCCH, in accordance with another implementation of the present disclosure. As shown in FIG. 2, there are two slots (e.g., slot 0 and slot 1) in each subframe, and each slot contains 14 symbols (e.g., the symbol 0 to the symbol 13).

In the example implementation illustrated in FIG. 2, the parameters $K_2$, S and L are configured as "1," "3" and "5," respectively. Therefore, the UL resource scheduled by the BS on a PUSCH may start from the symbol 3 of the slot 1 and end at the symbol 7 of the slot 1.

In an NR wireless communication system, a scheme of PUSCH repetition may be used to increase the reliability of data transmission. The PUSCH repetition scheme may include a UE performing a PUSCH transmission repeatedly for several times, where the number of times that the UE performs the PUSCH transmission may be referred to as the number of repetitions. It is noted that the phrases "the number of repetitions," "the number of nominal repetitions," "the number of PUSCH repetitions," "the number of nominal PUSCH repetitions," "the number of repetitions of a PUSCH transmission," "the number of nominal repetitions of a PUSCH transmission," and "the number of PUSCH transmissions" may be interchangeable in some implementations of the present disclosure.

In some implementations, in order to fulfill the requirement of URLLC, the PUSCH repetition scheme may be implemented as performing a PUSCH transmission repeatedly by a UE in several consecutive slots, where each repeated PUSCH transmission (or "PUSCH repetition") in each slot may have the same symbol allocation (e.g., corresponding to the same values of S and L). This type of PUSCH repetition scheme may be referred to as a slot-based repetition scheme.

In some implementations, an improved PUSCH repetition scheme is provided. Compared to the slot-based repetition scheme, the improved PUSCH repetition scheme can reduce the time interval between each two adjacent PUSCH repetitions, so as to decrease the overall transmission delay spreading over the consecutive slots. For example, the enhanced PUSCH repetition scheme may allow a UE to perform one or more repeated PUSCH transmissions in a slot. The improved PUSCH repetition scheme may be referred to as a non-slot-based repetition scheme.

In some implementations, when a BS schedules a UE to perform a PUSCH transmission, the BS may dynamically indicate to the UE to perform the PUSCH transmission with the slot-based repetition scheme or the non-slot-based repetition scheme.

In some implementations, a non-slot-based repetition scheme may include the operations listed below (e.g., operations (a) to (f)). However, it should be noted that the listed actions are shown for illustrative purposes only, and are not mean to limit the scope of the present disclosure. For example, one or more of operations listed below may be not be included in the non-slot-based repetition scheme in some implementations of the present disclosure.

The operations (a) through (f) may include:
(a) a BS (e.g., a gNB) may indicate to a UE a slot offset between a slot that contains a PDCCH scheduling a PUSCH transmission and a slot that contains the scheduled PUSCH transmission ($K_2$);
(b) the BS may indicate to the UE the starting symbol of the PUSCH transmission (S);
(c) the BS may indicate to the UE the length of this PUSCH transmission (L);
(d) the BS may indicate to the UE the number of the repetitions for this PUSCH transmission (e.g., how many times this PUSCH transmission should be repeated by the UE);
(e) the UE may start performing a repeated PUSCH transmission (or "the second PUSCH repetition") from the first upcoming UL symbol right after the end of this PUSCH transmission (or "the first PUSCH repetition"); and (f) each PUSCH repetition may start from the first upcoming UL symbol after the end of the previous PUSCH repetition.

In general, each PUSCH repetition may occupy L consecutive symbols. However, if the L consecutive symbols cross a DL symbol or a slot boundary, the PUSCH repetition may be divided into two or more actual PUSCH transmissions from the perspective of the Physical (PHY) layer.

Figure 3:
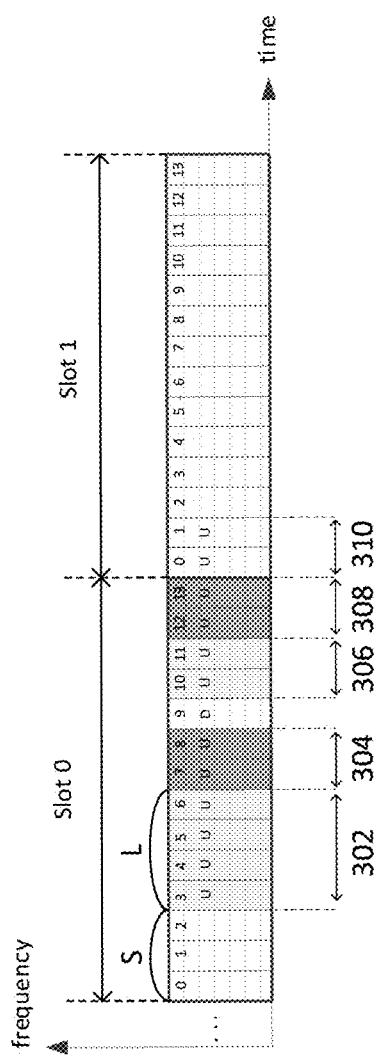
FIG. 3 is a diagram illustrating a scenario in which a repetition of a PUSCH transmission crosses a Downlink (DL) symbol or a slot boundary when the non-slot-based repetition scheme is applied, in accordance with an implementation of the present disclosure.

FIG. 3 is a diagram illustrating a scenario in which a repetition of a PUSCH transmission (or "PUSCH repetition") crosses a DL symbol or a slot boundary when the non-slot-based repetition scheme is applied, in accordance with an implementation of the present disclosure. As shown in FIG. 3, each of the slots (e.g., the slot 0 and the slot 1) may include 14 symbols (e.g., the symbol 0 to the symbol 13). Each symbol denoted by the letter "U" is a UL symbol, and each symbol denoted by the letter "D" is a DL symbol. In the implementation illustrated in FIG. 3, the values of S, L, and the number of repetitions configured by a BS (e.g., a gNB) are 3, 4 and 3, respectively.

It is noted that the number of repetitions configured by a BS (e.g., a gNB) to a UE may be referred to as the number of nominal repetitions, which may be different from the number of actual PUSCH transmissions performed by the UE from the perspective of the PHY layer. As shown in FIG. 3, the UE may know that the UL resource scheduled by the BS on a PUSCH transmission 302 may span from the symbol 3 to the symbol 6 in the slot 0 because the values of S and L are 3 and 4, respectively. In addition, because the number of nominal repetitions is 3 in the implementation, the UE may need to repeat the PUSCH transmission 302 (the first (nominal) PUSCH repetition) twice more at the upcoming UL symbols. As described above, the value of L is 4, so each nominal repetition may include four UL symbols. However, because the symbol 9 of the slot 0 is a DL symbol, the second (nominal) PUSCH repetition may be divided into two actual PUSCH transmissions (or "actual PUSCH repetitions"). As shown in FIG. 3, an actual PUSCH repetition 304 may span from the symbol 7 to the symbol 8 of the slot 0, and an actual PUSCH repetition 306 may span from the symbol 10 to the symbol 11 of the slot 0. The two actual PUSCH repetitions 304 and 306 may occupy four symbols in total, so they may be equivalent to the second (nominal) PUSCH repetition. Similarly, because the third (nominal) PUSCH repetition covers the slot boundary between the slot 0 and the slot 1, the third (nominal) PUSCH repetition may be divided into two actual PUSCH repetitions 308 and 310, where the actual PUSCH repetition 308 may span from the symbol 12 to the symbol 13 of the slot 0, and the actual PUSCH repetition 310 may span from the symbol 0 to the symbol 1 of the slot 1. Thus, in the implementation illustrated in FIG. 3, the number of actual PUSCH repetitions (e.g., five) may be larger than the number of nominal PUSCH repetitions (e.g., three).

On the other hand, in the slot-based repetition scheme, a BS (e.g., a gNB) may indicate to a UE the number of PUSCH repetitions by configuring the UE with a parameter (e.g., pusch-AggregationFactor). However, how a BS instructs a UE to perform a non-slot-based repetition scheme and how a BS informs a UE of the number of (nominal) repetitions in a non-slot-based repetition scheme are still undefined. To this end, several cases are provided to define UE behavior in the scenarios described above.

Case 1

In some implementations, a BS (e.g., a gNB) may reuse a parameter that is originally used for the slot-based repetition scheme to indicate to a UE the number of nominal repetitions for the non-slot-based repetition scheme. For example, this parameter may be a PUSCH aggregation factor (e.g., pusch-AggregationFactor).

Figure 4:
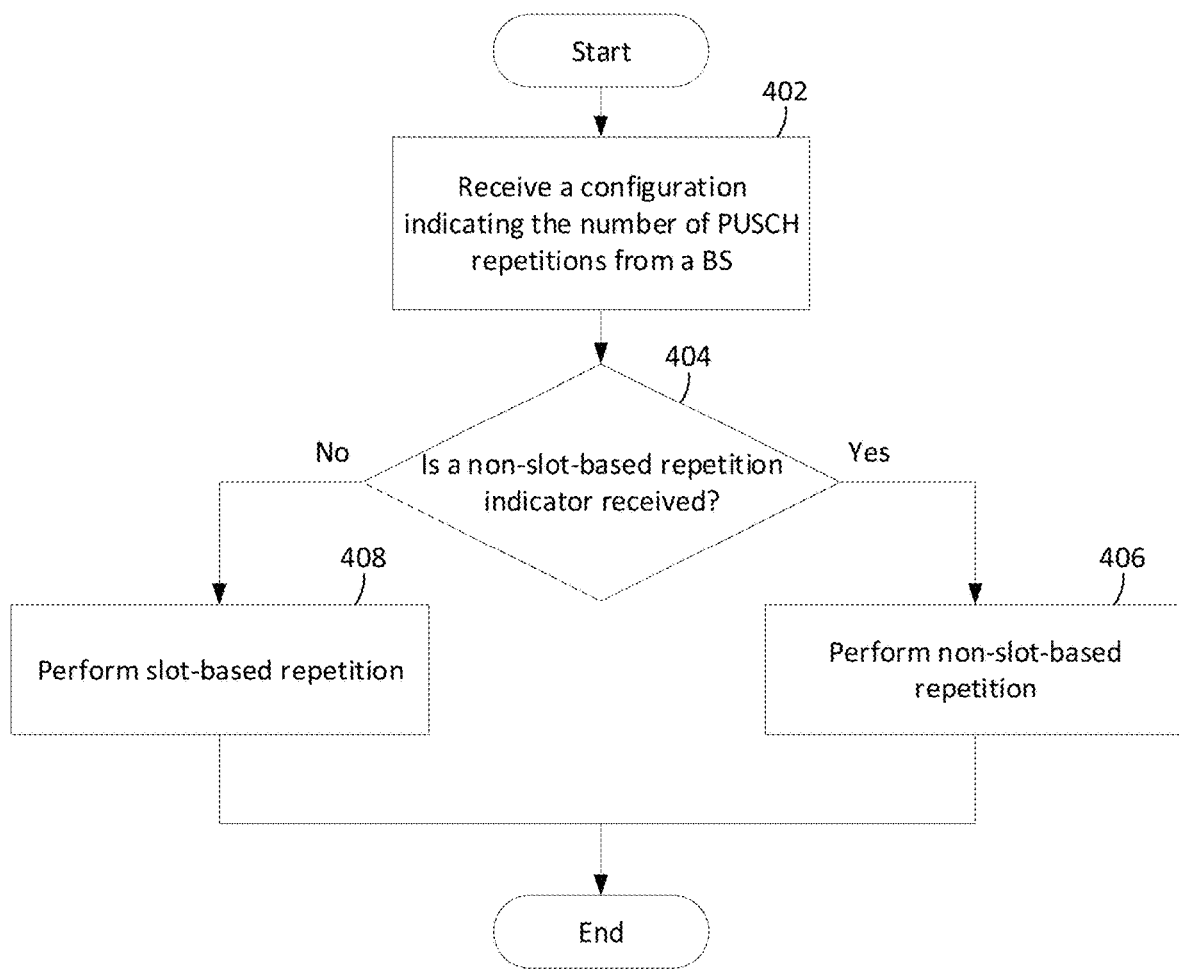
FIG. 4 is a flowchart for a method performed by a UE for repetition transmissions, in accordance with an implementation of the present disclosure.

FIG. 4 is a flowchart for a method performed by a UE for repetition transmissions, in accordance with an implementation of the present disclosure. As shown in FIG. 4, in action 402, a UE may receive a configuration indicating the number of PUSCH repetitions from a BS (e.g., a gNB). For example, the BS may use the pusch-AggregationFactor to indicate to the UE the number of (nominal) PUSCH repetitions.

In action 404, the UE may determine whether a non-slot-based repetition indicator (e.g., non-slot-rep) is received from the BS.

In action 406, if the UE receives the non-slot-rep from the BS, the UE may perform the non-slot-based repetition (e.g., performing a PUSCH transmission repeatedly based on the non-slot-based repetition scheme).

In action 408, if the UE does not receive the non-slot-rep, the UE may perform the slot-based repetition (e.g., performing a PUSCH transmission repeatedly based on the slot-based repetition scheme).

As described above, the UE may determine whether to perform the non-slot-based repetition based on whether the non-slot-rep is received/configured. If the UE is configured with the non-slot-rep for a PUSCH transmission, the UE may apply the non-slot-based repetition scheme to perform this PUSCH transmission, where the number of repetitions for this PUSCH transmission may be determined by the pusch-AggregationFactor.

In some implementations, action 402 may be omitted. In such implementations, if the UE is not configured with the pusch-AggregationFactor by the BS, the UE may set the number of (nominal) repetitions to 1. Once the number of repetitions is set to 1, the UE behavior of performing the PUSCH transmission may be the same as the UE behavior, which is that the UL resource of the PUSCH transmission scheduled by the BS does not cross any DL symbol or slot boundary.

Sub-Case 1.1

In some implementations, the non-slot-based repetition indicator (e.g., non-slot-rep) may be configured by a BS (e.g., a gNB) via the RRC layer. For example, the non-slot-rep may be configured by a BS via a DL RRC message.

In some implementations, during an RRC configuration or RRC reconfiguration procedure, a BS may configure the non-slot-rep to a UE per a UE basis via a specific DL RRC message. For example, a BS may include the non-slot-rep in an RRC reconfiguration message (e.g., an RRCReconfiguration message). An example Text Proposal (TP) of the RRC reconfiguration message is shown in Table 1.1-1.

TABLE 1.1-1

RRCReconfiguration message

```
RRCReconfiguration ::=                               SEQUENCE {
    rrc-TransactionIdentifier                            RRC-TransactionIdentifier,
    criticalExtensions                                   CHOICE {
        rrcReconfiguration                                   RRCReconfiguration-IEs,
        criticalExtensionsFuture                             SEQUENCE {}
    }
}
RRCReconfiguration-IEs ::=  SEQUENCE {
    radioBearerConfig       RadioBearerConfig                           OPTIONAL, -- Need M
    secondaryCellGroup      OCTET STRING (CONTAINING CellGroupConfig)   OPTIONAL, -- Need M
    non-slot-rep            OPTIONAL,
}
```

In some implementations, if a UE receives the Information Element (IE) of the non-slot-rep, the UE may apply the non-slot-based repetition scheme to perform a PUSCH transmission scheduled by a BS for the UE. In some other implementations, a BS may always configure the non-slot-rep to a UE, where the non-slot-rep may indicate either a first value (e.g., True value) or a second value (e.g., False value). If the first value is indicated, the UE may perform the non-slot-based repetition. If the second value is indicated, the UE may perform the slot-based repetition. An example TP is shown in Table 1.1-1a.

TABLE 1.1-1a 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting PUSCH scheduled by PDCCH with CRC scrambled with C-RNTI, MCS-C-RNTI, if the UE is configured with pusch-AggregationFactor and the non-slot-rep, the UE shall repeat the TB pusch-AggregationFactor times across the symbols determined by following the non-slot-based repetition scheme (rule); or
When transmitting PUSCH scheduled by PDCCH with CRC scrambled with C-RNTI, MCS-C-RNTI, if the UE is configured with pusch-AggregationFactor and the non-slot-rep is set to true, the UE shall repeat the TB pusch-AggregationFactor times across the symbols determined by following the non-slot-based repetition scheme (rule);
It is noted the actual number of repetitions can be larger than the number configured by the pusch-AggregationFactor due the PUSCH transmission across slot boundary or UL/DL direction of symbols.

In some implementations, during an RRC configuration or RRC reconfiguration procedure, a BS may configure the non-slot-rep to a UE per a cell group basis via a specific DL RRC message. For example, a BS may include the non-slot-rep in a cell group configuration (e.g., the CellGroupConfigIE), a Media Access Control (MAC)-layer cell group configuration (e.g., the MAC-CellGroupConfig IE) or a PHY-layer cell group configuration (e.g., the PhysicalCellGroupConfig IE) in an RRC reconfiguration message. Example TPs of the CellGroupConfig IE, the MAC-CellGroupConfig IE and the PhysicalCellGroupConfig IE are shown in Tables 1.1-2, 1.1-3 and 1.1-4, respectively.

TABLE 1.1-2

CellGroupConfig information element

```
CellGroupConfig ::=        SEQUENCE {
    cellGroupId                                                        CellGroupId,
    rlc-BearerToAddModList  SEQUENCE (SIZE(1..maxLC-ID)) OF RLC-Bearer-Config      OPTIONAL,
    rlc-BearerToReleaseList SEQUENCE (SIZE(1..maxLC-ID)) OF LogicalChannelIdentity OPTIONAL,
    mac-CellGroupConfig     MAC-CellGroupConfig                                    OPTIONAL,
    physicalCellGroupConfig PhysicalCellGroupConfig                                OPTIONAL,
    spCellConfig            SpCellConfig                                           OPTIONAL,
    sCellToAddModList       SEQUENCE (SIZE (1..maxNrofSCells)) OF SCellConfig      OPTIONAL,
    sCellToReleaseList      SEQUENCE (SIZE (1..maxNrofSCells)) OF SCellIndex       OPTIONAL,
    (...)
    non-slot-rep            OPTIONAL,
}
```

TABLE 1.1-3

MAC-CellGroupConfig information element

| | | |
|---|---|---|
| MAC-CellGroupConfig ::= | SEQUENCE { | |
| drx-Config | SetupRelease { DRX-Config } | OPTIONAL, -- Need M |
| schedulingRequestConfig | SchedulingRequestConfig | OPTIONAL, -- Need M |
| bsr-Config | BSR-Config | OPTIONAL, -- Need M |
| tag-Config | TAG-Config | OPTIONAL, -- Need M |
| phr-Config | SetupRelease { PHR-Config } | OPTIONAL, -- Need M |
| skipUplinkTxDynamic | BOOLEAN, | |
| cs-RNTI | SetupRelease { RNTI-Value } | OPTIONAL, -- Need M |
| (...) | | |
| non-slot-rep | OPTIONAL, | |
| } | | |

TABLE 1.1-4

PhysicalCellGroupConfig information element

| | | |
|---|---|---|
| PhysicalCellGroupConfig ::= | SEQUENCE{ | |
| harq-ACK-SpatialBundlingPUCCH | ENUMERATED {true} | OPTIONAL, -- Need R |
| harq-ACK-SpatialBundlingPUSCH | ENUMERATED {true} | OPTIONAL, -- Need R |
| p-NR | P-Max | OPTIONAL, -- Need R |
| pdsch-HARQ-ACK-Codebook | ENUMERATED {semiStatic, dynamic}, | |
| tpc-SRS-RNTI | RNTI-Value | OPTIONAL, -- Need R |
| tpc-PUCCH-RNTI | RNTI-Value | OPTIONAL, -- Need R |
| tpc-PUSCH-RNTI | RNTI-Value | OPTIONAL,-- Need R |
| sp-CSI-RNTI | RNTI-Value | OPTIONAL, -- Need R |
| cs-RNTI | SetupRelease { RNTI-Value } | OPTIONAL, -- Need M |
| (...) | | |
| non-slot-rep | OPTIONAL, | |
| } | | |
| } | | |

In some implementations, if a UE receives the non-slot-rep, the PUSCH transmission scheduled by a BS within the indicated serving Cell Group (CG) for the UE may apply the non-slot-based repetition scheme. In some other implementations, a BS may always configure the non-slot-rep to a UE, where the non-slot-rep may indicate either a first value (e.g., True value) or a second value (e.g., False value). If the first value is indicated, the UE may perform the non-slot-based repetition. If the second value is indicated, the UE may perform the slot-based repetition. An example TP is shown in Table 1.1-4a.

In some implementations, during an RRC configuration or RRC reconfiguration procedure, a BS (e.g., a gNB) may configure the non-slot-rep to a UE per a serving cell basis via a DL RRC message. For example, the BS may transmit the non-slot-rep to the UE by including the non-slot-rep in a common serving cell configuration (e.g., the ServingCell-ConfigCommon IE), a serving cell configuration (e.g., the ServingCellConfig IE) or a PUSCH serving cell configuration (e.g., the PUSCH-ServingCellConfig IE) in an RRC reconfiguration message (e.g., RRCReconfiguration mes- TABLE 1.1-4a 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting a PUSCH scheduled by PDCCH with CRC scrambled with C-RNTI, MCS-C-RNTI, if the UE is configured with pusch-AggregationFactor and the PUSCH is on a cell group which is configured with non-slot-rep, the UE shall repeat the TB pusch-AggregationFactor times across the symbols determined by following the non-slot-based repetition scheme (rule); or
When transmitting a PUSCH scheduled by PDCCH with CRC scrambled with C-RNTI, MCS-C-RNTI, if the UE is configured with pusch-AggregationFactor and the PUSCH is on a cell group which is configured with non-slot-rep and the non-slot-rep is set to true, the UE shall repeat the TB pusch-AggregationFactor times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

sage). Examples of TPs of the ServingCellConfigCommon IE and the ServingCellConfig IE are shown in Tables 1.1-5 and 1.1-6, respectively.

tations, a BS may always configure the non-slot-rep to a UE, where the non-slot-rep may indicate either a first value (e.g., True value) or a second value (e.g., False value). If the first

TABLE 1.1-5

ServingCellConfigCommon information element

```
ServingCellConfigCommon ::=   SEQUENCE {
   physCellId                 PhysCellId                    OPTIONAL,
   frequencyInfoDL            FrequencyInfoDL               OPTIONAL,
   initialDownlinkBWP         BWP-DownlinkCommon            OPTIONAL,
   uplinkConfigCommon         UplinkConfigCommon            OPTIONAL,
   supplementaryUplinkConfig  UplinkConfigCommon            OPTIONAL,
   ssb-PositionsInBurst       CHOICE {
      shortBitmap                                           BIT STRING (SIZE (4)),
      mediumBitmap                                          BIT STRING (SIZE (8)),
      longBitmap                                            BIT STRING (SIZE (64))
   }OPTIONAL,
   ssb-periodicityServingCell ENUMERATED { ms5, ms10, ms20, ms40, ms80, ms160, spare2, spare1 } OPTIONAL,
   (...)
   subcarrierSpacing          SubcarrierSpacing             OPTIONAL, -- Need S
   ...
}
UplinkConfigCommon ::=        SEQUENCE {
   frequency InfoUL            FrequencyInfoUL              OPTIONAL,
   initialUplinkBWP            BWP-UplinkCommon             OPTIONAL
}
   (...)
   non-slot-rep                OPTIONAL,
}
```

TABLE 1.1-6

ServingCellConfig information element

```
ServingCellConfig ::=   SEQUENCE{
   tdd-UL-DL-ConfigurationDedicated  TDD-UL-DL-ConfigDedicated     OPTIONAL, -- Cond TDD
   initialDownlinkBWP                BWP-DownlinkDedicated         OPTIONAL,  -- Cond ServCellAdd
   downlinkBWP-ToReleaseList         SEQUENCE (SIZE (1..maxNrofBWPs)) OF BWP-Id       OPTIONAL,
   -- Need N
   downlinkBWP-ToAddModList          SEQUENCE (SIZE (1..maxNrofBWPs)) OF BWP-Downlink   OPTIONAL,
   -- Need N
   firstActiveDownlinkBWP-Id         BWP-Id                        OPTIONAL, -- Need R
   bwp-InactivityTimer               ENUMERATED {ms2, ms3, ..., spare2, spare1 }   OPTIONAL,
   defaultDownlinkBWP-Id             BWP-Id                        OPTIONAL, -- Need M
   uplinkConfig                      UplinkConfig                  OPTIONAL,
   supplementaryUplink               UplinkConfig                  OPTIONAL,
   pdsch-ServingCellConfig           SetupRelease { PDSCH-ServingCellConfig }   OPTIONAL, -- Need M
   csi-MeasConfig                    SetupRelease { CSI-MeasConfig }   OPTIONAL, -- Need M
   carrierSwitching                  SetupRelease { SRS-CarrierSwitching  }   OPTIONAL, -- Need M
   sCellDeactivationTimer            ENUMERATED {ms20, ms40, ..., spare2,spare1}   OPTIONAL,
   (...)
}
UplinkConfig ::=        SEQUENCE {
   initialUplinkBWP                  BWP-UplinkDedicated           OPTIONAL,
   uplinkBWP-ToReleaseList           SEQUENCE (SIZE (1..maxNrofBWPs)) OF BWP-Id       OPTIONAL, -- Need N
   uplinkBWP-ToAddModList            SEQUENCE (SIZE (1.maxNrofBWPs)) OF BWP-Uplink OPTIONAL,
   firstActiveUplinkBWP-Id           BWP-Id                        OPTIONAL, -- Need R
   pusch-ServingCellConfig           SetupRelease { PUSCH-ServingCellConfig }   OPTIONAL, -- Need M
   ...
}
non-slot-rep                         OPTIONAL,
```

In some implementations, if a UE receives the non-slot-rep, the PUSCH transmission scheduled by a BS (e.g., a gNB) on the indicated serving cell for the UE may apply the non-slot-based repetition scheme. In some other implementations, a BS may always configure the non-slot-rep to a UE, where the non-slot-rep may indicate either a first value (e.g., True value) or a second value (e.g., False value). If the first value is indicated, the UE may perform the non-slot-based repetition. If the second value is indicated, the UE may perform the slot-based repetition. An example TP is shown in Table 1.1-6a.

TABLE 1.1-6a 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting a PUSCH scheduled by PDCCH with CRC scrambled with C-RNTI, MCS-C-RNTI, if the UE is configured with pusch-AggregationFactor and the PUSCH is on a serving cell which is configured with non-slot-rep, the UE shall repeat the TB pusch-AggregationFactor times across the symbols determined by following the non-slot-based repetition scheme (rule); or
When transmitting a PUSCH scheduled by PDCCH with CRC scrambled with C-RNTI, MCS-C-RNTI, if the UE is configured with pusch-AggregationFactor and the PUSCH is on a serving cell which is configured with non-slot-rep and the non-slot-rep is set to true, the UE shall repeat the TB pusch-AggregationFactor times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

In some implementations, during an RRC configuration or RRC reconfiguration procedure, a BS (e.g., a gNB) may configure the non-slot-rep to the UE per a BWP basis via a specific DL RRC message (e.g., an RRCReconfiguration message). For example, a BS may transmit the non-slot-rep to the UE by including the non-slot-rep in the BWP (e.g., an IE used to configure a BWP), the BWP-Uplink IE, the BWP-UplinkDedicated IE, the BWP-Downlink IE, the BWP-DownlinkDedicated IE, the PUSCH-ConfigCommon IE, or the PUSCH-Config IE in the RRCReconfiguration message. An Example TP of the PUSCH-Config IE is shown in Table 1.1-7.

TABLE 1.1-7

| PUSCH-Config information element |
|---|
| PUSCH-Config ::=                      SEQUENCE { |
|    dataScramblingIdentityPUSCH          INTEGER (0..1007)               OPTIONAL, |
|    txConfig                                   ENUMERATED {codebook, nonCodebook}, |
|    dmrs-UplinkForPUSCH-MappingTypeA     SetupRelease { DMRS-UplinkConfig }      OPTIONAL, |
|    dmrs-UplinkForPUSCH-MappingTypeB     SetupRelease { DMRS-UplinkConfig }      OPTIONAL, |
|    pusch-PowerControl                 PUSCH-PowerControl           OPTIONAL, |
|    frequencyHopping                   ENUMERATED {mode1, mode2}     OPTIONAL, |
|    frequencyHoppingOffsetLists           SEQUENCE (SIZE (1..4)) OF INTEGER (1.. |
| maxNrofPhysicalResourceBlocks-1)     OPTIONAL, |
|    resourceAllocation                 ENUMERATED { resourceAllocationType0, resourceAllocationType1, |
| dynamicSwitch}, |
|    pusch-AllocationList                SEQUENCE (SIZE(1..maxNrofUL-Allocations)) OF PUSCH- |
| TimeDomainResourceAllocation     OPTIONAL, |
|    pusch-AggregationFactor              ENUMERATED { n2, n4, n8 }      OPTIONAL, |
|    mcs-Table                                ENUMERATED {qam256}          OPTIONAL, |
|    mcs-TableTransformPrecoder           ENUMERATED {qam256}          OPTIONAL, |
|    ... |
|    non-slot-rep                          OPTIONAL, |
| } |

In some implementations, if a UE receives the non-slot-rep, the PUSCH transmission scheduled by a BS (e.g., a gNB) on the indicated (UL) BWP for the UE may apply the non-slot-based repetition scheme. In some other implementations, a BS may always configure the non-slot-rep to a UE, where the non-slot-rep may indicate either a first value (e.g., True value) or a second value (e.g., False value). If the first value is indicated, the UE may perform the non-slot-based repetition. If the second value is indicated, the UE may perform the slot-based repetition. An example TP is shown in Table 1.1-7a.

TABLE 1.1-7a 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting a PUSCH scheduled by PDCCH with CRC scrambled with C-RNTI, MCS-C-RNTI, if the UE is configured with pusch-AggregationFactor and the PUSCH is on a (UL) BWP which is configured with non-slot-rep, the UE shall repeat the TB pusch-AggregationFactor times across the symbols determined by following the non-slot-based repetition scheme (rule); or
When transmitting a PUSCH scheduled by PDCCH with CRC scrambled with C-RNTI, MCS-C-RNTI, if the UE is configured with pusch-AggregationFactor and the PUSCH is on a (UL) BWP which is configured with non-slot-rep and the non-slot-rep is set to true, the UE shall repeat the TB pusch-AggregationFactor times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

Sub-Case 1.2

In some implementations, the non-slot-rep may be configured by a BS (e.g., a gNB) via the PHY layer. The non-slot-rep may indicate whether a UE needs to apply the non-slot-based repetition scheme to perform a PUSCH transmission.

In some implementations, even if a UE is not configured with the pusch-AggregationFactor (which may imply that the number of nominal repetitions is "1"), the UE may still apply the non-slot-based repetition scheme to perform the corresponding PUSCH transmission.

In some implementations, the non-slot-rep may represent or indicate a specific DCI format. A UE may determine whether to apply the non-slot-based repetition scheme to perform a PUSCH transmission based on the DCI format of the DCI corresponding to the PUSCH transmission. For example, if the DCI received by a UE has a particular DCI format, the UE may apply the non-slot-based repetition scheme to perform the PUSCH transmission corresponding to the DCI.

In some implementations, the non-slot-rep may represent or indicate a specific field of DCI. A UE may determine whether to apply the non-slot-based repetition scheme to perform a PUSCH transmission corresponding to the DCI based on the specific field. For example, if the DCI received by a UE contains a specific field that explicitly or implicitly indicates the UE to apply the non-slot-based repetition scheme, the UE may apply the non-slot-based repetition scheme to perform the PUSCH transmission according to the DCI.

In some implementations, the specific field of DCI may be a newly introduced field or an individual field in the DCI. For example, the field may be a one-bit field that may be set to "1" (or "0") to indicate that the non-slot-based repetition scheme is applied.

In some implementations, at least one field included in the DCI format(s) defined in the 3GPP Technical Specification (TS) 38.212 may be used to implicitly indicate to a UE to apply the non-slot-based repetition scheme. For example, the "UL/SUL indicator" field in the DCI may be set to "1" (or "0") by a BS to indicate to a UE that the non-slot-based repetition scheme is applied.

In some implementations, the non-slot-rep may represent or indicate a specific RNTI of a UE. The value of the UE's specific RNTI may be configured by a BS via a DL RRC message.

In some implementations, a new RNTI (e.g., Non-Slot-based Repetition-RNTI (NSR-RNTI)) of a UE may be used. For example, if the DCI having a DCI format 0_0 or 0_1 (or another DCI format) with CRC scrambled by the NSR-RNTI is received, a UE may apply the non-slot-based repetition scheme to perform a PUSCH transmission corresponding to the DCI.

In some implementations, an existing RNTI (e.g., a Modulation Coding Scheme Cell RNTI (MCS-C-RNTI)) that is provided in the 3GPP TS 38.331 may be used. For example, if the DCI with a DCI format 0_0 or 0_1 (or another DCI format) with CRC scrambled by the MCS-C-RNTI is received, a UE may apply the non-slot-based repetition scheme to perform a PUSCH transmission corresponding to the DCI.

Case 2

In some implementations, a new/independent/individual parameter (e.g., pusch-AggregationFactor-urllc) may be used to indicate the number of (nominal) repetitions for the non-slot-based repetition scheme. For example, a BS (e.g., a gNB) may apply the pusch-AggregationFactor-urllc or the pusch-AggregationFactor to indicate the number of repetitions for a PUSCH transmission. In some implementations, the pusch-AggregationFactor may be provided in the 3GPP TS 38.331.

Figure 5:
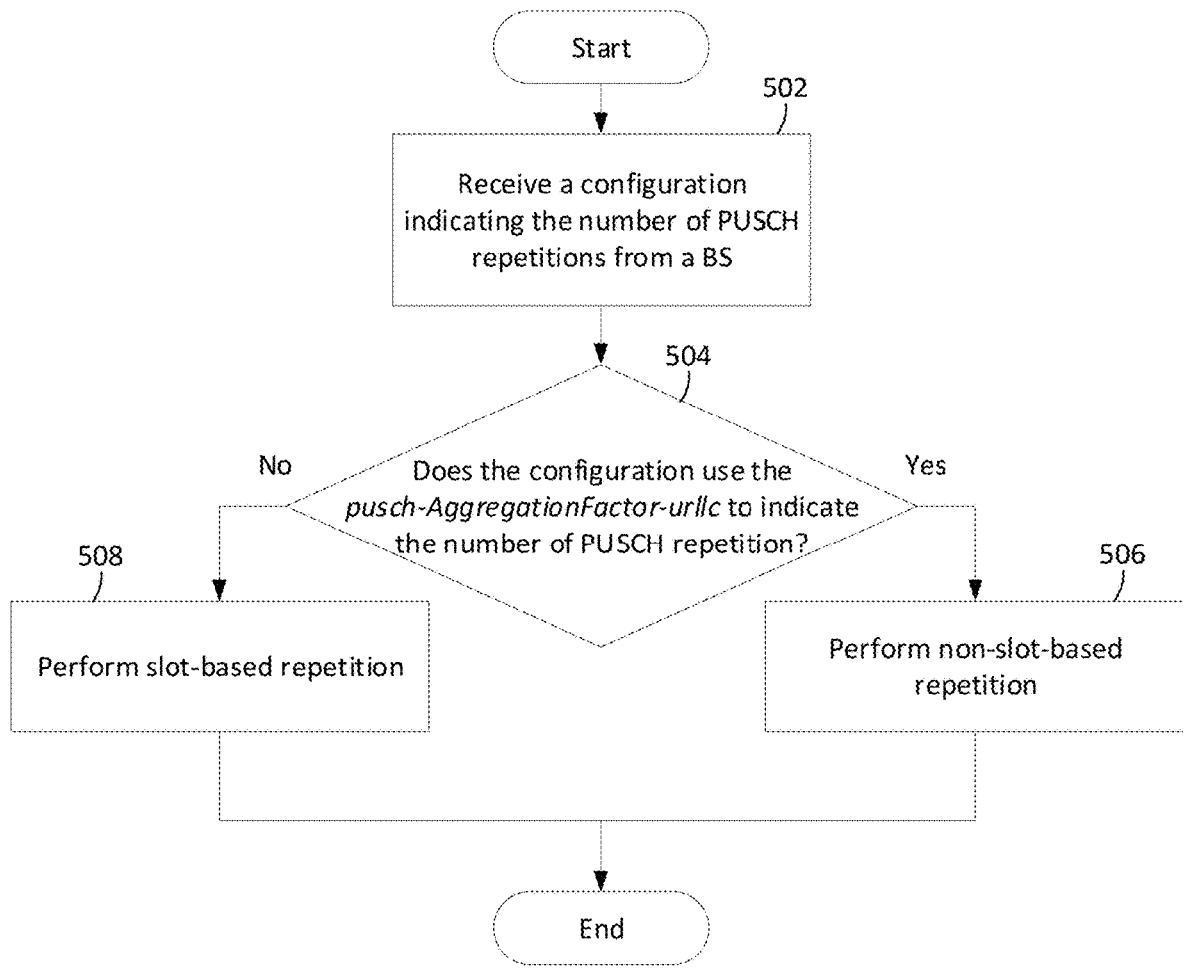
FIG. 5 is a flowchart for a method performed by a UE for repetition transmissions, in accordance with an implementation of the present disclosure.

FIG. 5 is a flowchart for a method performed by a UE for repetition transmissions, in accordance with an implementation of the present disclosure. As shown in the FIG. 5, in action 502, a UE may receive a configuration indicating the number of PUSCH repetitions from a BS (e.g., a gNB).

In action 504, the UE may determine whether the configuration received in action 502 uses the pusch-AggregationFactor-urllc to indicate the number of PUSCH repetitions.

If the outcome of action 504 is Yes, because the UE is configured with the pusch-AggregationFactor-urllc, the UE may apply the non-slot-based repetition scheme to perform the PUSCH transmission, as shown in action 506.

Conversely, if the outcome of action 504 is No, the UE may apply the slot-based repetition scheme to perform the PUSCH transmission, as shown in action 508.

Sub-Case 2.1

In some implementations, the pusch-AggregationFactor-urllc may be configured by a BS (e.g., a gNB) via the RRC layer. For example, the pusch-AggregationFactor-urllc may be configured by the BS via a DL RRC message. In some implementations, a BS may configure/indicate the pusch-AggregationFactor and the pusch-AggregationFactor-urllc to a UE. For example, a first BWP may be configured by a BS with a first PUSCH configuration (e.g., PUSCH-config) including the pusch-AggregationFactor-urllc, and a second BWP may be configured by the BS with a second PUSCH configuration (e.g., PUSCH-config) including the pusch-AggregationFactor. In this sense, the UE may know that a PUSCH transmission on the first BWP should apply the non-slot-based repetition scheme, while a PUSCH transmission on the second BWP should apply the slot-based repetition scheme.

In some implementations, a UE configured with the pusch-AggregationFactor-urllc may apply the non-slot-based repetition scheme for all PUSCH transmissions. During an RRC configuration or RRC reconfiguration procedure, a BS (e.g., a gNB) may configure the pusch-AggregationFactor-urllc to a UE per a UE basis via a specific DL RRC message. For example, a BS may include the pusch-AggregationFactor-urllc in the RRCReconfiguration message. An example TP of the RRCReconfiguration message may be obtained by replacing the non-slot-rep in Table 1.1-1 with the pusch-AggregationFactor-urllc.

In some implementations, if a UE receives the pusch-AggregationFactor-urllc, a PUSCH transmission on a UL BWP (which may not be configured with the pusch-AggregationFactor) scheduled by a BS (e.g., a gNB) for the UE may be performed by the UE according to the non-slot-based repetition scheme. An example TP is shown in Table 2.1a.

TABLE 2.1a 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting PUSCH scheduled by PDCCH with CRC scrambled with C-RNTI, MCS-C-RNTI, if the UE is configured with pusch-AggregationFactor-urllc, the UE shall repeat the TB pusch-AggregationFactor-urllc times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

In some implementations, in addition to indicating the number of repetitions corresponding to a PUSCH transmission, the pusch-AggregationFactor-urllc may further indicate that the PUSCH transmission scheduled by the BS (e.g., a gNB) within a serving CG for a UE should be performed with the non-slot-based repetition scheme. During an RRC configuration or RRC reconfiguration procedure, a BS (e.g., a gNB) may configure the pusch-AggregationFactor-urllc to a UE per a cell group basis via a specific DL RRC message. For example, the BS may transmit the pusch-AggregationFactor-urllc to the UE by including the pusch-AggregationFactor-urllc in the CellGroupConfig IE, the MAC-CellGroupConfig IE, or the PhysicalCellGroupConfig IE in an RRCReconfiguration message. Example TPs of the CellGroupConfig IE, the MAC-CellGroupConfig IE and the PhysicalCellGroupConfig IE may be obtained by replacing the non-slot-rep in Tables 1.1-2, 1.1-3 and 1.1-4 with the pusch-AggregationFactor-urllc, respectively.

In some implementations, if a UE receives the pusch-AggregationFactor-urllc, a PUSCH transmission on a UL BWP (which is not configured with the pusch-AggregationFactor) scheduled by a BS (e.g., a gNB) within an indicated serving CG for the UE may be performed by the UE according to the non-slot-based repetition scheme. An example TP is shown in Table 2.1b.

TABLE 2.1b 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting a PUSCH scheduled by PDCCH with CRC scrambled with C-RNTI, MCS-C-RNTI, if the UE is configured with pusch-AggregationFactor-urllc and the PUSCH

TABLE 2.1b-continued is on a cell group which is configured with the pusch-AggregationFactor-urllc, the UE shall repeat the TB pusch-AggregationFactor-urllc times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

In some implementations, in addition to indicating the number of repetitions corresponding to a PUSCH transmission, the pusch-AggregationFactor-urllc may further indicate that the PUSCH transmission scheduled by the BS (e.g., a gNB) on a serving cell for a UE should be performed with the non-slot-based repetition scheme. During an RRC configuration or RRC reconfiguration procedure, a BS (e.g., a gNB) may configure the pusch-AggregationFactor-urllc to a UE per a serving cell basis via a specific DL RRC message. For example, the BS may transmit the pusch-AggregationFactor-urllc to the UE by including the pusch-AggregationFactor-urllc in the ServingCellConfigCommon IE, the ServingCellConfig IE, or the PUSCH-ServingCellConfig IE in an RRCReconfiguration message. Example TPs of the ServingCellConfigCommon IE and the ServingCellConfig IE may be obtained by replacing the non-slot-rep in Tables 1.1-5 and 1.1-6 with the pusch-AggregationFactor-urllc, respectively.

In some implementations, if a UE receives the pusch-AggregationFactor-urllc, a PUSCH transmission on a UL BWP (which is not configured with the pusch-AggregationFactor) scheduled by a BS (e.g., a gNB) on an indicated serving cell for the UE may be performed by the UE according to the non-slot-based repetition scheme. An example TP is shown in Table 2.1c.

TABLE 2.1c 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting a PUSCH scheduled by PDCCH with CRC scrambled with C-RNTI, MCS-C-RNTI, if the UE is configured with pusch-AggregationFactor-urllc and the PUSCH is on the serving cell group which is configured with the pusch-AggregationFactor-urllc, the UE shall repeat the TB pusch-AggregationFactor-urllc times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

In some implementations, in addition to indicating the number of repetitions corresponding to a PUSCH transmission, the pusch-AggregationFactor-urllc may further indicate that the PUSCH transmission scheduled by the BS (e.g., a gNB) on a (UL) BWP for a UE should be applied with the non-slot-based repetition scheme. During an RRC configuration or RRC reconfiguration procedure, a BS (e.g., a gNB) may configure the pusch-AggregationFactor-urllc to a UE per a BWP basis via a specific DL RRC message (e.g., the RRCReconfiguration message). For example, the BS may transmit the pusch-AggregationFactor-urllc to the UE by including the pusch-AggregationFactor-urllc in the BWP (e.g., an IE used to configure a BWP), the BWP-Uplink IE, the BWP-UplinkDedicated IE, the BWP-Downlink IE, the BWP-DownlinkDedicated IE, the PUSCH-ConfigCommon IE, or the PUSCH-Config IE. An example TP of the PUSCH-Config IE may be obtained by replacing the non-slot-rep in Table 1.1-7 with the pusch-AggregationFactor-urllc in an RRCReconfiguration message.

In some implementations, if a UE receives the pusch-AggregationFactor-urllc, a PUSCH transmission scheduled by a BS (e.g., a gNB) on the indicated (UL) BWP for the UE may be performed by the UE according to the non-slot-based repetition scheme. An example TP is shown in Table 2.1d.

TABLE 2.1d 6.1.2 Resource allocation
6.1.2.1 Resource allocation in time domain
When transmitting PUSCH scheduled by PDCCH with CRC scrambled with C-RNTI, MCS-C-RNTI, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot.
When transmitting a PUSCH scheduled by PDCCH with CRC scrambled with C-RNTI, MCS-C-RNTI, if the UE is configured with pusch-AggregationFactor-urllc and the PUSCH is on the BWP which is configured with the pusch-AggregationFactor-urllc, the UE shall repeat the TB pusch-AggregationFactor-urllc times across the symbols determined by following the non-slot-based repetition scheme (rule);
It is noted the actual number of repetitions can be larger than the number configured by the pusch-AggregationFactor due the PUSCH transmission across a slot boundary or UL/DL direction of symbols.

---

In some implementations, a BS (e.g., a gNB) may (pre-)configure a UE with a repetition list (e.g., pusch-AggregationFactor-urllcList) that includes one or more specific values (R). Each specific value may represent a specific number of (nominal) repetitions. In some implementations, the repetition list may be a Time Domain Resource Allocation (TDRA) table. An example of the repetition list is shown in Table 2.1e.

TABLE 2.1e

| Row index | $K_2$ | S | L | R |
|---|---|---|---|---|
| 0 | 1 | 3 | 4 | 2 |
| 1 | 1 | 4 | 6 | 3 |
| 2 | 2 | 2 | 4 | 4 |

As shown in Table 2.1e, a repetition list may include several entries (or rows). Each entry in the repetition list may be indexed by a row index and include a set of parameters for configuring a PUSCH transmission, such as the parameters $K_2$, S, L and R, where each value of the parameter R in the repetition list may represent a specific number of repetitions, and the definitions of the parameters $K_2$, S and L are described with reference to FIGS. 1 and 2.

In some implementations, a BS may indicate to a UE which entry in the repetition list to use via specific signaling (e.g., DCI). The UE may determine the resource location and/or the number of repetitions for a PUSCH transmission based on the value(s) in the indicated entry of the repetition list. For example, according to Table 2.1e, if a BS transmits DCI including a row index of "2" to a UE, the UE may know that the third entry/row in the repetition list should be applied when performing a PUSCH transmission scheduled by the DCI. As shown in Table 2.1e, the values of $K_2$, S, L and R in the third entry/row of the repetition list are "2," "2," "4" and "4," respectively. In such a case, the number of repetitions for the PUSCH transmission corresponding to the DCI is 4.

It should be noted that the implementation in Table 2.1e is shown for illustrative purposes only, and is not meant to limit the scope of the present disclosure. For example, the repetition list may include any combination of the parameter R and/or other parameters/indices. In another example, a repetition list may include only the value(s) of the parameter R.

In some implementations, a BS may indicate to a UE which value (e.g., the number of repetitions) in the repetition list to apply to a PUSCH transmission by using the pusch-AggregationFactor-urllc. For example, referring to Table 2.1e, the pusch-AggregationFactor-urllc may be used as a row index to indicate one of the values of the parameter R. For example, if the value of the pusch-AggregationFactor-urllc is "0," the first entry of the repetition list may be applied and the number of repetitions is 2; if the value of the pusch-AggregationFactor-urllc is "1," the second entry of the repetition list may be applied and the number of repetitions is 3, and so on.

In some implementations, the pusch-AggregationFactor-urllc may be configured by a BS per a UE basis, per a serving CG basis, per a serving cell basis, per a UL BWP basis, or per a configured grant configuration basis.

Sub-Case 2.2
In some implementations, the pusch-AggregationFactor-urllc may be configured by a BS (e.g., a gNB) via the PHY layer. The pusch-AggregationFactor-urllc may indicate to a UE whether to apply the non-slot-based repetition scheme for a PUSCH transmission.

In some implementations, the pusch-AggregationFactor-urllc may represent a specific field in a specific DCI format(s). For example, if a UE receives DCI with a specific DCI format that contains a field of the pusch-AggregationFactor-urllc, the UE may know that the PUSCH transmission corresponding to the DCI should be performed based on the non-slot-based repetition scheme. In addition, the number of repetitions corresponding to the PUSCH transmission may be indicated by the value of the field of the pusch-AggregationFactor-urllc.

In some implementations, the field of the pusch-AggregationFactor-urllc may be implemented by at least one of the following approaches (a) to (c):
(a) using a fixed number of bit stream as the field of the pusch-AggregationFactor-urllc;
(b) using the value of the pusch-AggregationFactor-urllc (a bit stream) to represent the number of repetitions corresponding to a PUSCH transmission; and
(c) using the pusch-AggregationFactor-urllc to indicate to a UE which value (e.g., a specific number of repetitions) in a repetition list should be applied for a PUSCH transmission. A BS (e.g., a gNB) may (pre)configure the repetition list corresponding to the PUSCH transmission via, for example, RRC signaling.

Case 3
In some implementations, a BS (e.g., a gNB) may configure both the pusch-AggregationFactor and the pusch-AggregationFactor-urllc to the UE. The pusch-AggregationFactor may indicate the number of repetitions for a PUSCH transmission when the slot-based repetition scheme is applied, while the pusch-AggregationFactor-urllc may indicate the number of repetitions for a PUSCH transmission when the non-slot-based repetition scheme is applied.

In some implementations, a BS (e.g., a gNB) may further indicate to a UE whether to apply the slot-based repetition scheme or the non-slot-based repetition scheme for each PUSCH transmission per a dynamic scheduling basis and/or per a configured grant configuration basis. In some implementations, depending on how a BS configures the pusch-AggregationFactor-urllc, the pusch-AggregationFactor-urllc may be configured by the BS per at least one of a UE basis, a serving CG basis, a serving cell basis, a UL BWP basis and a configured grant configuration basis. For example, if the pusch-AggregationFactor-urllc is configured by a BS per a UL BWP basis, and the BS schedules a PUSCH transmission for a UE on a UL BWP and indicates to the UE to apply the non-slot-based repetition scheme for this PUSCH transmission, the UE may apply the pusch-AggregationFactor-urllc (which corresponds to the UL BWP) to determine the number of repetitions for this PUSCH transmission.

Case 4

In some implementations, in a case that a PUSCH transmission corresponds to a configured grant configuration, a BS (e.g., a gNB) may reuse a first parameter repK (which is provided in the 3GPP TS 38.331) to indicate to a UE the number of (nominal) repetitions. The BS may further use a second parameter non-slot-rep to indicate to the UE to apply the non-slot-based repetition scheme. For example, if a UE is configured with the non-slot-rep for a configured grant configuration, the UE may apply the non-slot-based repetition scheme to perform a PUSCH transmission corresponding to the configured grant configuration, where the number of (nominal) repetitions for this PUSCH transmission may be determined by the first indicator repK. In some implementations, the second indicator (non-slot-rep) may, but not limited to, be implemented by at least one of the sub-cases described below.

Sub-Case 4.1

In some implementations, the non-slot-rep may be configured by a BS (e.g., a gNB) via the RRC layer. For example, the non-slot-rep may be configured by a BS via a specific DL RRC message.

In some implementations, during an RRC configuration or RRC reconfiguration procedure, a BS (e.g., a gNB) may configure the non-slot-rep to the UE per a UE basis via a specific DL RRC message. For example, a BS (e.g., a gNB) may transmit the non-slot-rep to a UE by including the non-slot-rep IE in the RRCReconfiguration message. When the UE receives the non-slot-rep IE, the UE may apply the non-slot-based repetition scheme to perform a PUSCH transmission corresponding to a configured grant configuration configure by a BS for the UE.

In some implementations, during an RRC configuration or RRC reconfiguration procedure, a BS (e.g., a gNB) may configure the non-slot-rep to the UE per a CG basis via a specific DL RRC message. For example, a BS (e.g., a gNB) may transmit the non-slot-rep to a UE by including the non-slot-rep in the CellGroupConfig IE, the MAC-CellGroupConfig IE, or the PhysicalCellGroupConfig IE in the RRCReconfiguration message. When the UE receives the non-slot-rep, the UE may apply the non-slot-based repetition scheme to perform a PUSCH transmission corresponding to a configured grant configuration configured by a BS within the indicated serving CG for the UE.

In some implementations, during an RRC configuration or RRC reconfiguration procedure, a BS (e.g., a gNB) may configure the non-slot-rep to the UE per a serving cell basis via a specific DL RRC message. For example, a BS (e.g., a gNB) may transmit the non-slot-rep to a UE by including the non-slot-rep in the ServingCellConfigCommon IE (as shown in Table 1.1-5), the ServingCellConfig IE (as shown in Table 1.1-6), or the PUSCH-ServingCellConfig IE in the RRCReconfiguration message. When the UE receives the non-slot-rep, the UE may apply the non-slot-based repetition scheme to perform a PUSCH transmission corresponding to a configured grant configuration configured by a BS on the indicated serving cell for the UE.

In some implementations, during an RRC configuration or RRC reconfiguration procedure, a BS (e.g., a gNB) may configure the non-slot-rep to the UE per a BWP basis via a specific DL RRC message (e.g., the RRCReconfiguration message). For example, a BS (e.g., a gNB) may transmit the non-slot-rep to a UE by including the non-slot-rep in the BWP IE (e.g., an IE used to configure a BWP), the BWP-Uplink IE, the BWP-UplinkDedicated IE, the BWP-Downlink IE, the BWP-DownhnkDedicated IE, the PUSCH-ConfigCommon IE, or the PUSCH-Config IE (as shown in Table 1.1-7) in the RRCReconfiguration message. When the UE receives the non-slot-rep, the UE may apply the non-slot-based repetition scheme to perform a PUSCH transmission corresponding to a configured grant configuration configured by a BS on the indicated UL BWP for the UE.

In some implementations, a BS (e.g., a gNB) may always configure the non-slot-rep to the UE. In some implementations, the non-slot-rep may indicate either a first value (e.gf., True value) or a second value (e.g., False value). If the first value is indicated, the UE may perform the non-slot-based repetition. If the second value is indicated, the UE may perform the slot-based repetition.

Sub-Case 4.2

In some implementations, the non-slot-rep may be configured by a BS (e.g., a gNB) via the PHY layer. For example, the BS may configure the non-slot-rep to a UE by indicating to the UE a specific DCI format, a specific RNTI, or a specific value of a field of a specific DCI format. In some implementations, the non-slot-rep may indicate to a UE whether to perform a PUSCH transmission corresponding to a configured grant configuration based on the non-slot-based repetition scheme.

Case 5

In some implementations, a UE may be implicitly indicated whether to apply the non-slot-based repetition scheme.

Sub-Case 5.1

In some implementations, when the value of at least one of S, L, and S+L is larger than a threshold that is preconfigured by a BS via a DL RRC message and/or MAC signaling, a UE may be implicitly indicated to apply the non-slot-based repetition scheme or the slot-based repetition scheme.

Sub-Case 5.2

In some implementations, the non-slot-based repetition schemed may be implicitly applied by a UE for a Hybrid Automatic Repeat Request (HARQ) retransmission of the corresponding PUSCH transmission.

Sub-Case 5.3

In some implementations, the non-slot-based repetition may be implicitly applied by a UE when a PUSCH is on a BWP which is configured with a specific slot format preconfigured by a BS via RRC signaling (e.g., a slot format indicator (e.g., SlotFormatIndicator)). In some implementations, a PUSCH duration may include one or more flexible symbols (defined in, e.g., the 3GPP TS 38.213). Each flexible symbol may be used as a DL symbol or a UL symbol, depending on the scheduling of a BS.

Sub-Case 5.4

In some implementations, if a PUSCH duration/transmission does not cross any flexible symbol, a UE may implicitly apply the non-slot-based repetition scheme for the PUSCH duration/transmission in a case that the PUSCH transmission is on a BWP configured with a specific slot format (e.g., preconfigured by a BS (e.g., a gNB) via RRC signaling such as the SlotFormatIndicator). In such implementations, the PUSCH duration/transmission may not include any flexible symbol.

Sub-Case 5.5

In some implementations, when a UE receives the DCI that indicates a UL grant for a PUSCH transmission, the UE may apply the non-slot-based repetition scheme to perform the PUSCH transmission if the time duration between the DCI and the PUSCH transmission/duration is less than a threshold, or if the value of $K_2$ configured in the PUSCH-TimeDomainResourceAllocation IE is less than a threshold, where the PUSCH-TimeDomainResourceAllocation IE may be provided in the 3GPP TS 38.331. In this sub-case, the number of nominal repetitions may be configured by the pusch-AggregationFactor.

Sub-Case 5.6

In some implementations, when a UE receives the DCI that indicates a UL grant for a PUSCH transmission, the UE may apply the non-slot-based repetition scheme to perform the PUSCH transmission if the Modulation Coding Scheme (MCS) table (e.g., mcs-Table) configured by a BS for the PUSCH transmission is a specific MCS table (e.g., the mcs-Table is set to qam64LowSE). In this sub-case, the number of nominal repetitions may be configured by the pusch-AggregationFactor.

Sub-Case 5.7

In some implementations, in a case that a configured grant configuration is configured and activated by a BS (e.g., a gNB) on a UL BWP, a UE may apply the non-slot-based repetition scheme for a PUSCH transmission corresponding to the configured grant configuration if the periodicity of the configured grant configuration is less than a threshold.

Sub-Case 5.8

In some implementations, in a case that a configured grant configuration is configured and activated by a BS (e.g., a gNB) on a UL BWP, a UE may apply the non-slot-based repetition scheme for a PUSCH transmission corresponding to the configured grant configuration if the configured grant configuration belongs to a specific configured grant configuration group that is configured by the BS. For example, the BS may transmit the specific configured grant configuration to the UE via RRC signaling and indicate to the UE to apply the non-slot-based repetition scheme. In some other implementations, the specific configured grant configuration may be a configured grant configuration having a specific configured grant configuration identity (ID) and/or a specific configured grant configuration group ID. In such implementations, the BS may configure the configured grant ID/configured grant configuration group ID of each configuration grant configuration to the UE via RRC signaling.

Case 6

In some implementations, a new/independent/individual parameter repK-urllc may be used to indicate the number of nominal repetitions when the non-slot-based repetition scheme is applied to a PUSCH transmission corresponding to a configured grant configuration. For example, a BS (e.g., a gNB) may apply the repK-urllc or the repK (as defined in the 3GPP TS 38.331) to indicate the number of repetitions of the PUSCH transmission. If the repK-urllc is configured for a configured grant configuration, the PUSCH transmission on the configured grant may apply the non-slot-based repetition scheme.

In some implementations, each (sub-)case described above may be applied when one or more specific conditions are satisfied. For example, the specific conditions may include:

(a) the UE is configured with a specific Access Stratum (AS) layer function (e.g., a Packet Data Convergence Protocol (PDCP) duplication function);

(b) the UE is configured with a specific AS layer function (e.g., a PDCP duplication function), and the specific AS layer function is activated; and (c) the UE is configured with an RRC connection with two or more gNBs/eNBs.

Figure 6:
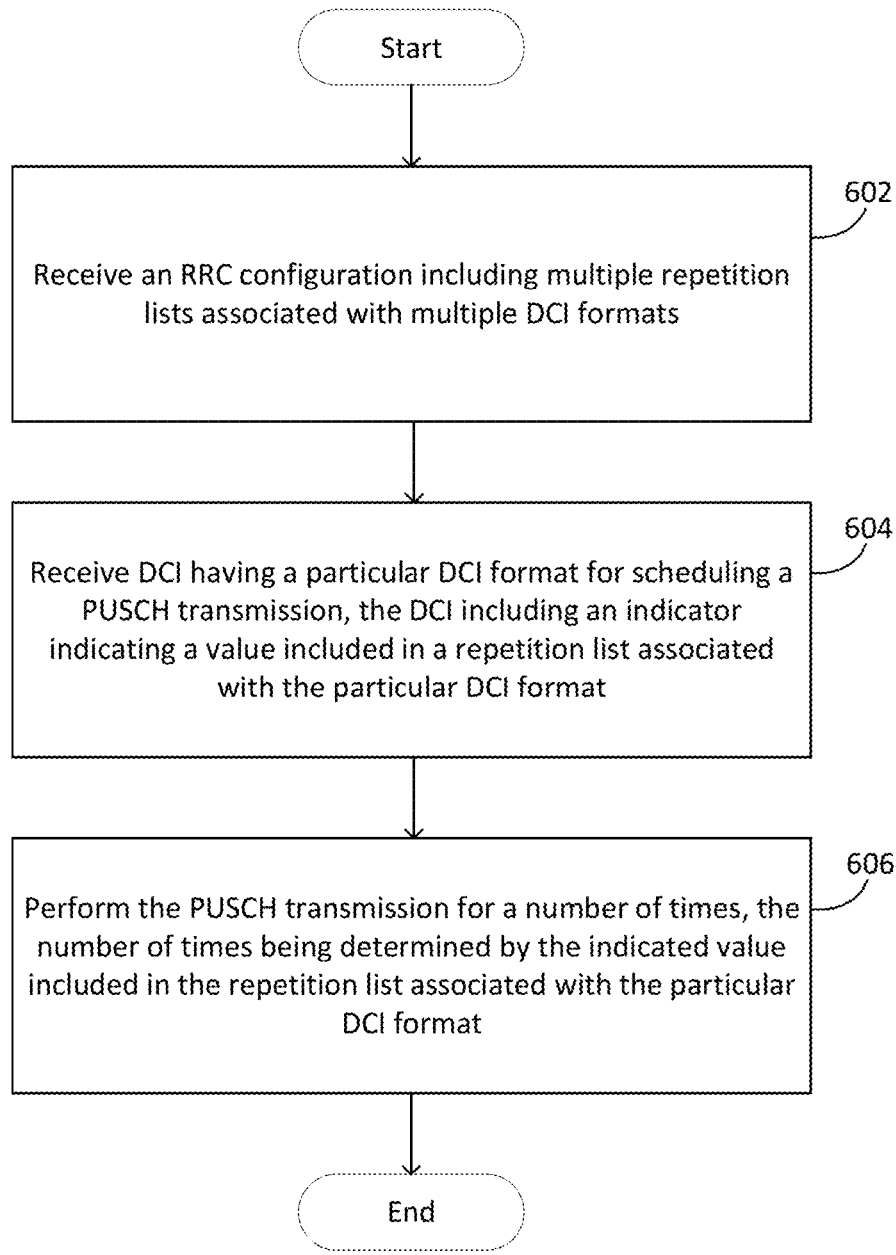
FIG. 6 is a flowchart for a method performed by a UE for repetition transmissions, in accordance with an implementation of the present disclosure.

FIG. 6 is a flowchart for a method performed by a UE for repetition transmissions, in accordance with an implementation of the present disclosure. It should be noted that although actions 602, 604 and 606 are delineated as separate actions represented as independent blocks in FIG. 6, these separately delineated actions should not be construed as necessarily order dependent. The order in which the actions are performed in FIG. 6 is not intended to be construed as a limitation, and any number of the described blocks may be combined in any order to implement the method, or an alternate method. Moreover, one or more of actions 602, 604 and 606 may be omitted in some implementations of the present disclosure.

As shown in FIG. 6, in action 602, a UE may receive an RRC configuration including multiple repetition lists associated with multiple DCI formats. In some implementations, the repetition lists and the DCI formats may have a one-to-one correspondence. For example, if the RRC configuration includes two repetition lists (e.g., a repetition list #1 and a repetition list #2), each repetition list may be associated with a corresponding DCI format. For example, the repetition list #1 may be associated with a DCI format 0_1, and the repetition list #2 may be associated with a DCI format 0_2. In some other implementations, each repetition list may be associated with a DCI format, but the repetition lists and the DCI formats may not have a one-to-one correspondence. For example, two or more repetition lists may be associated with the same DCI format, and/or two or more DCI formats may be associated with the same repetition list.

In some implementations, each repetition list in the RRC configuration may include one or more values. Each value may indicate a specific number of repetitions for a PUSCH transmission (e.g., a value of the parameter R in Table 2.1e).

In action 604, the UE may receive the DCI having a particular DCI format for scheduling a PUSCH transmission. The DCI may include an indicator that indicates a value included in a repetition list (in the RRC configuration) associated with the particular DCI format. For example, if the repetition list #1 is associated with the DCI format 0_1 and the repetition list #2 is associated with the DCI format 0_2, the indicator contained in the DCI may be used to indicate a value included in the repetition list #1 when the DCI format of the received DCI is the DCI format 0_1 (which is associated with the repetition list #1), and may be used to indicate a value included in the repetition list #2 when the DCI format of the received DCI is the DCI format 0_2 (which is associated with the repetition list #2).

In some implementations, the indicator in the DCI may directly represent the number of repetitions of a PUSCH transmission (e.g., a value of the parameter R in Table 2.1e). In some other implementations, the indicator in the DCI may be an index that indicates an entry of the repetition list that includes a specific number of repetitions of a PUSCH transmission (e.g., a row index in Table 2.1e).

In action 606, the UE may perform the PUSCH transmission for a number of times (e.g., the UE may repeat the PUSCH transmission among a set of consecutive UL symbols), where the number of times may be determined by the indicated value included in the repetition list associated with the particular DCI format. For example, if the indicated value included in the repetition list is "4," the UE may determine that the number of repetitions for the PUSCH transmission scheduled by the DCI is 4. In this condition, the UE may perform an initial transmission of the scheduled PUSCH/TB, followed by repeating the initial transmission of the scheduled PUSCH/TB three times. So, the total number of times the PUSCH/TB transmission is performed by the UE is 4 (i.e., one initial PUSCH/TB transmission (or the "first PUSCH/TB repetition")+three repeated PUSCH/TB transmissions (or the "second, third and fourth PUSCH/TB repetitions")).

In some implementations, the UE may determine whether to apply the non-slot-based repetition scheme to perform the PUSCH transmission according to the particular DCI format and the RRC configuration.

In some implementations, the RRC configuration including the repetition lists may be a BWP-specific configuration that is dedicated to a specific BWP. That is, a BS may configure the RRC configuration (or the repetition lists) per a BWP basis.

Figure 7:
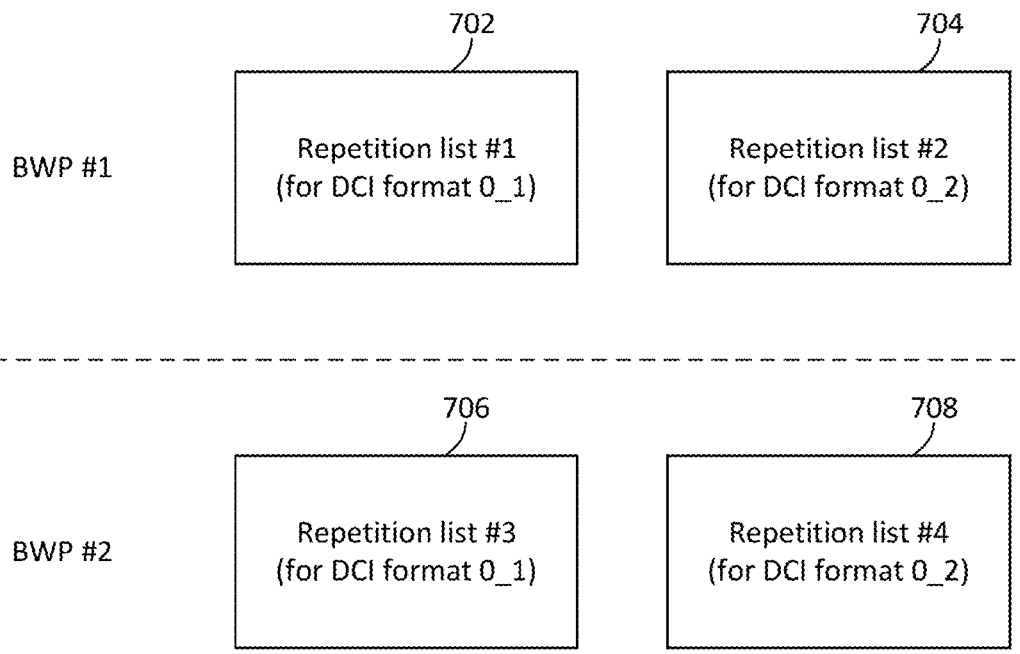
FIG. 7 is a diagram illustrating a Base Station (BS) configuring repetition lists per a Bandwidth Part (BWP) basis, in accordance with an implementation of the present disclosure.

FIG. 7 is a diagram illustrating a BS configuring the repetition lists per a BWP basis, in accordance with an implementation of the present disclosure.

As shown in FIG. 7, a BS may configure a repetition list #1 702 and a repetition list #2 704 for a BWP #1, and configure a repetition list #3 706 and a repetition list #4 708 for a BWP #2. Because the repetition lists are configured by the BS per a BWP basis, the one-to-one correspondence between the repetition lists and the DCI formats for the BWP #1 may be independent of the one-to-one correspondence between the repetition lists and the DCI formats for the BWP #2. As shown in FIG. 7, for the BWP #1, the repetition list #1 702 is associated with the DCI format 0_1 and the repetition list #2 704 is associated with the DCI format 0_2; for the BWP #2, the repetition list #3 706 is associated with the DCI format 0_1, and the repetition list #4 708 is associated with the DCI format 0_2.

The following provides the non-limiting descriptions of certain terms.

Cell: in some implementations, a cell (e.g., a PCell or an S Cell) may be a radio network object that may be uniquely identified by a UE through the corresponding identification information, which may be broadcast by a UTRAN access point in a geographical area. A cell may be operated in a Frequency Division Duplex (FDD) or a Time Division Duplex (TDD) mode.

Serving Cell: in some implementations, for a UE operating in the RRC_CONNECTED state and not configured with Carrier Aggregation (CA)/Dual Connectivity (DC), the UE may be configured with only one serving cell (e.g., a PCell). For a UE operating in the RRC_CONNECTED state and configured with CA/DC, the UE may be configured with multiple serving cells including an SpCell and one or more SCells.

Carrier Aggregation (CA): in some implementations, in case of CA, two or more Component Carriers (CCs) may be aggregated. A UE may simultaneously receive or transmit signals on one or more of the CCs depending on its capabilities. CA may be supported with both the contiguous and non-contiguous CCs. When CA is applied, the frame timing and the System Frame Number (SFN) may be aligned across cells that are aggregated. In some implementations, the maximum number of configured CCs for a UE may be 16 for DL and 16 for UL. When CA is configured, the UE may have only one RRC connection with the network. During the RRC connection establishment/re-establishment/handover, one serving cell may provide the Non-Access Stratum (NAS) mobility information, and at RRC connection re-establishment/handover, one serving cell may provide the security input, where the serving cell may be referred to as the PCell. Depending on UE capabilities, SCells may be configured to form together with the PCell as a set of serving cells for the UE. The configured set of serving cells for a UE therefore always consists of one PCell and one or more SCells.

Configured Grant: in some implementations, for configured grant type 1, the RRC entity may directly provide the configured uplink grant (including the periodicity). For configured grant type 2, the RRC entity may define the periodicity of the PUSCH resources of the CG, while the PDCCH addressed to the Configured Scheduling-RNTI (CS-RNTI) may either signal and activate the configured uplink grant or deactivate it. That is, the PDCCH addressed to the CS-RNTI may indicate that the configured uplink grant can be reused according to the periodicity defined by the RRC entity, until the configured unlink grant is deactivated. When a configured uplink grant is active, a UL transmission according to the configured uplink grant may be performed if the UE cannot find its C-RNTI/CS-RNTI/MCS-C-RNTI on the PDCCH(s). If the UE receives its C-RNTI/CS-RNTI/MCS-C-RNTI on the PDCCH(s), the PDCCH allocation may override the configured uplink grant. In some implementations, the usage of MCS-C-RNTI may be equivalent to that of C-RNTI in the MAC procedures (except for the C-RNTI MAC Control Element (CE)).

HARQ: in some implementations, a HARQ process may be used to ensure the transmissions between two or more peer entities at Layer 1 (e.g., PHY layer). A single HARQ process may support a TB when the PHY layer is not configured for DL/UL spatial multiplexing. When the PHY layer is configured for the DL/UL spatial multiplexing, a single HARQ process may support one or multiple TBs. Each serving cell may correspond to a HARQ entity, where each HARQ entity may support a parallel processing of the DL and UL HARQ processes.

HARQ-Acknowledgement (HARQ-ACK): in some implementations, a HARQ-ACK may include a 1-bit indicator, where the HARQ-ACK may be a Negative Acknowledgement (NACK) when the bit value of the indicator is "0" and may be a positive Acknowledgement (ACK) when the bit value of the indicator is "1."

Timer: in some implementations, the MAC entity of the UE may setup one or more timers for individual purposes, such as triggering uplink signaling retransmissions or limiting uplink signaling retransmission periods. When a timer (e.g., the timers described in various implementations of the present application) maintained by the MAC entity starts, the timer may start running until it stops or expires. In addition, the timer may not run when it does not start. A timer may start when it is not running. Also, a timer may restart when it is running. In some implementations, a timer may always start or restart from an initial value, where the initial value can be, but is not limited to, configured by the gNB via downlink RRC signaling.

BWP: in some implementations, a BWP may be a subset of the total cell bandwidth of a cell. By configuring one or more BWPs to the UE and informing the UE that which of the configured BWPs is the currently the active BWP, Bandwidth Adaptation (BA) may be achieved. To enable the BA mechanism on the PCell, the gNB may configure the UE with one or more UL and DL BWPs. In case of CA, to enable the BA mechanism on S Cells, the gNB may configure the UE with one or more DL BWPs at least (which means that there may be no UL BWPs configure to the UE). For the PCell, the initial BWP may be the BWP used for initial access. For the SCell(s), the initial BWP may be the BWP configured for the UE to first operate during the SCell activation process. In some implementations, the UE may be configured with a First-Active UL BWP by a firstActiveUplinkBWP IE field. If the First-Active UL BWP is configured for an SpCell, the firstActiveUplinkBWP IE field may contain the ID of the UL BWP to be activated when the RRC (re)configuration is performed. If the field is absent, the RRC (re)configuration may not trigger a BWP switch. If the First-Active uplink BWP is configured for an SCell, the firstActiveUplinkBWP IE field may contain the ID of the UL BWP to be used upon the MAC-activation of an SCell.

PDCCH: in some implementations, a gNB may dynamically allocate resources to the UE via a C-RNTI/MCS-C-RNTI/CS-RNTI on one or more PDCCHs. The UE may always monitor the PDCCH(s) in order to find possible assignments when its DL reception is enabled (e.g., activity governed by DRX when configured). In some implementations, when CA is configured, the same C-RNTI may be applied to all serving cells.

Physical Downlink Shared Channel (PDSCH)/Physical Uplink Shared Channel (PUSCH): in some implementations, a PDCCH may be used to schedule DL transmissions on a PDSCH and UL transmissions on a PUSCH.

Time Alignment Timer: in some implementations, the RRC entity may configure the initial value of a time alignment timer. The time alignment timer (e.g., timeAlignmentTimer) may be used for the maintenance of UL time alignment, where the time alignment timer may be configured and maintained per a Timing Advance Group (TAG) basis. The time alignment timer may be used to control the time length that the MAC entity considers the serving cells belonging to the associated TAG to be UL time aligned.

Start and Length Indicator (SLIV): in some implementations, the SLIV may be used for the time domain allocation for a PUSCH/PDSCH. The SLIV may define the starting symbol and the number of consecutive symbols for a PUSCH/PDSCH allocation.

Transport Block (TB): The data from the upper layer (e.g., MAC layer/entity) to the PHY layer may be usually referred to as a TB(s).

It is noted that the terms, definitions and abbreviations described in the present disclosure may come from the existing documentation (European Telecommunications Standards Institute (ETSI), International Telecommunication Union (ITU), and etc.) or newly created by the 3GPP experts.

In some implementations, a Reference Signal (RS) ID may be replaced by any other ID(s) which is used for explicitly or implicitly indicating a new beam to the gNB.

In some implementations, a DL RRC message may be an RRC reconfiguration message (e.g., RRCReconfiguration), an RRC resume message (e.g., RRCResume), an RRC reestablishment message (e.g., RRCReestablishment), an RRC setup message (e.g., RRCSetup), or any other DL unicast RRC message.

In some implementations, a beam may be considered as a spatial domain filter. For example, a wireless device (e.g., a UE) may apply the spatial filter in an analog domain by adjusting the phase and/or amplitude of a signal before transmitting the signal through a corresponding antenna element. In another example, the spatial filter may be applied in a digital domain by Multi-Input Multi-Output (MIMO) techniques in the wireless communication system. For example, a UE may perform a PUSCH transmission by using a specific beam which is a specific spatial/digital domain filter. In some implementations, a beam may be represented by (or corresponding to) an antenna, an antenna port, an antenna element, a group of antennas, a group of antenna ports, or a group of antenna elements. In some implementations, a beam may be formed by (or associated with) a specific RS resource. The beam may be equivalent to a spatial domain filter through which the Electromagnetic (EM) waves are radiated.

In some implementations, the transmitted signaling means that the MAC CE/MAC Protocol Data Unit (PDU)/layer 1 signaling/higher layer signaling that contains (or corresponds to) the signaling is starting to be transmitted, completely transmitted, or has already delivered to the corresponding HARQ process/buffer for transmission. In some implementations, the transmitted signaling means that the corresponding HARQ-ACK feedback of a specific MAC PDU is received, where the specific MAC PDU may include the MAC CE/layer 1 signaling/higher layer signaling that contains (or corresponds to) the signaling. In some implementations, the transmitted signaling means that the MAC CE/MAC PDU corresponding to the signaling is built or generated.

In some implementations, a HARQ-ACK feedback may be implemented by the DCI format 0_0, 0_1 or other DCI format(s) of the DCI received by the UE from the gNB on a PDCCH. In some implementations, the received DCI may contain a New Data Indicator (NDI) that may be set to a specific value (e.g., 1). In addition, the DCI may indicate a HARQ process ID which is the same as the HARQ process ID applied by (or indicated to) a HARQ process of the MAC PDU (carrying the Beam Failure Recovery request (BFRQ) MAC CE) transmission.

In some implementations, when a MAC-CE-based Beam Failure Recovery (BFR) procedure is configured for an SCell, it means that the BFR function for the SCell is configured and/or enabled. In some implementations, when the BFR function for the SCell is configured, it means that the BS (e.g., a gNB) has configured one or more MAC-CE-based BFR configurations for the SCell. In some implementations, when the BFR function for the SCell is enabled, it means that the BS (e.g., a gNB) has configured one or more MAC-CE-based BFR configurations for the SCell, with some implicit or explicit mechanisms being provided to activate or deactivate the BFR function of the UE/MAC entity/serving cell.

In some implementations, a PDCCH may be transmitted by the gNB to the UE, and the UE may receive the PDCCH from the gNB. Similarly, a PDSCH may be transmitted by the gNB to the UE, and the UE may receive the PDSCH from the gNB. For UL transmissions, a PUSCH/PUCCH may be transmitted by the UE to the gNB, and the PUSCH/Physical Uplink Control Channel (PUCCH) may be received by the gNB.

In some implementations, a PDSCH/PUSCH transmission may span multiple symbols in the time domain, where the time duration of a PDSCH/PUSCH (transmission) may be a time interval that starts from the beginning of the first symbol of the PDSCH/PUSCH (transmission) and end at the end of the last symbol of the PDSCH/PUSCH (transmission).

In some implementations, the terms "interrupt," "stop," "cancel," and "skip" may be interchangeable.

In some implementations, the operation of instructing the PHY layer to generate acknowledgement may include, or have the same meaning as, the operation of instructing the PHY layer to perform/generate a HARQ-ACK feedback (procedure).

In some implementations, the terms "acknowledgement," "HARQ-ACK," and "HARQ-ACK feedback" may be interchangeable.

Figure 8:
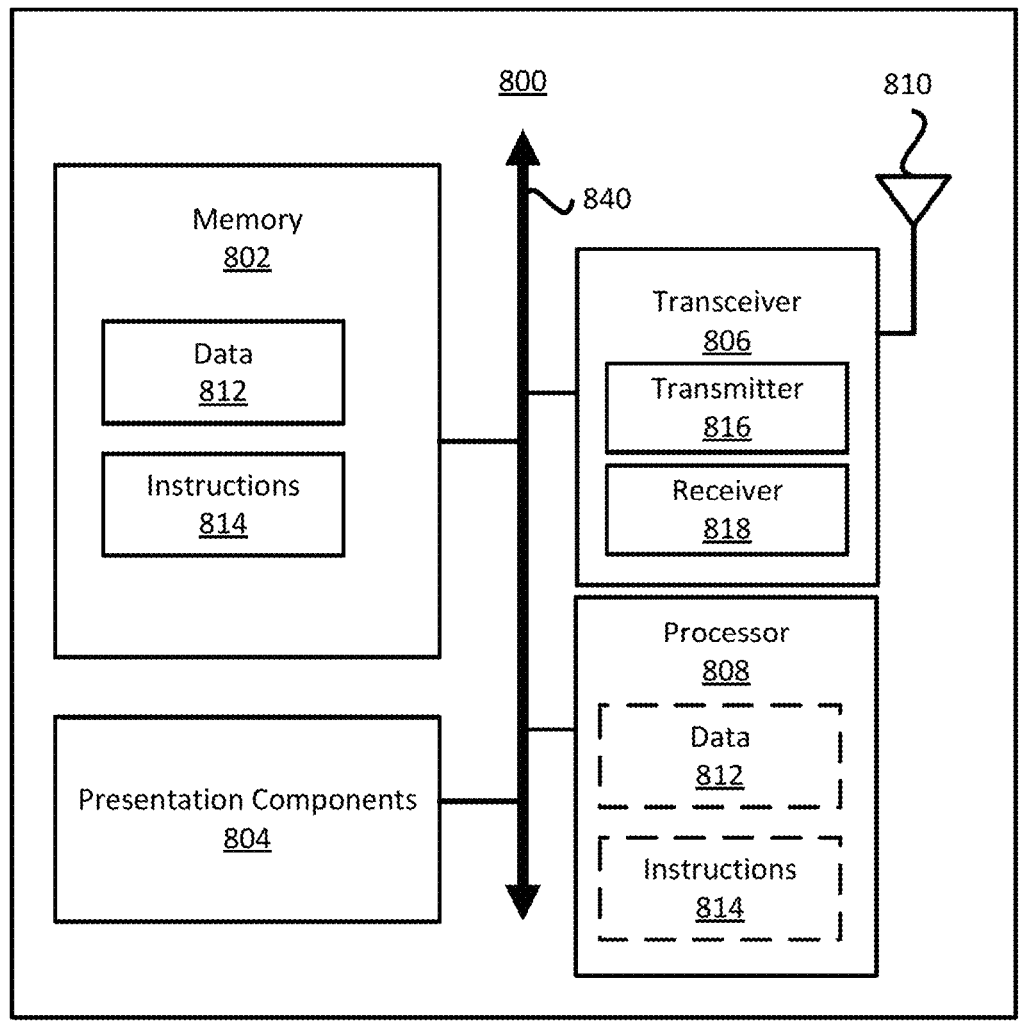
FIG. 8 is a block diagram illustrating a node for wireless communication, in accordance with various aspects of the present disclosure.

FIG. 8 is a block diagram illustrating a node for wireless communication, in accordance with various aspects of the present disclosure. As shown in FIG. 8, a node 800 may include a transceiver 806, a processor 808, a memory 802, one or more presentation components 804, and at least one antenna 810. The node 800 may also include an RF spectrum band module, a BS communications module, a network communications module, and a system communications management module, Input/Output (I/O) ports, I/O components, and power supply (not explicitly shown in FIG. 8). Each of these components may be in communication with each other, directly or indirectly, over one or more buses 840. In one implementation, the node 800 may be a UE or a BS that performs various functions described herein, for example, with reference to FIGS. 1 through 7.

The transceiver 806 having a transmitter 816 (e.g., transmitting/transmission circuitry) and a receiver 818 (e.g., receiving/reception circuitry) may be configured to transmit and/or receive time and/or frequency resource partitioning information. In some implementations, the transceiver 806 may be configured to transmit in different types of subframes and slots including, but not limited to, usable, non-usable and flexibly usable subframes and slot formats. The transceiver 806 may be configured to receive data and control channels.

The node 800 may include a variety of computer-readable media. Computer-readable media can be any available media that can be accessed by the node 800 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, Radio Frequency (RF), infrared and other wireless media. Combinations of any of the above should also be included within the scope of computer-readable media.

The memory 802 may include computer-storage media in the form of volatile and/or non-volatile memory. The memory 802 may be removable, non-removable, or a combination thereof. For example, the memory 802 may include solid-state memory, hard drives, optical-disc drives, etc. As illustrated in FIG. 8, the memory 802 may store computer-readable and/or -executable instructions 814 (e.g., software codes) that are configured to, when executed, cause the processor 808 to perform various functions described herein, for example, with reference to FIGS. 1 through 7. Alternatively, the instructions 814 may not be directly executable by the processor 808 but may be configured to cause the node 800 (e.g., when compiled and executed) to perform various functions described herein.

The processor 808 (e.g., having processing circuitry) may include an intelligent hardware device, a Central Processing Unit (CPU), a microcontroller, an ASIC, etc. The processor 808 may include memory. The processor 808 may process the data 812 and the instructions 814 received from the memory 802, and information through the transceiver 806, the base band communications module, and/or the network communications module. The processor 808 may also process information to be sent to the transceiver 806 for transmission through the antenna 810, to the network communications module for transmission to a core network.

One or more presentation components 804 may present data indications to a person or other device. Examples of presentation components 804 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE) for repetition transmissions, the method comprising:
   receiving Downlink Control Information (DCI) scheduling an uplink transmission;
   identifying a DCI format of the DCI;
   selecting, from a plurality of sets of preconfigured values, a set of preconfigured values that is mapped to the DCI format;
   determining a number of times the uplink transmission is required to be repeated from the selected set of preconfigured values;
   receiving a Radio Resource Control (RRC) configuration indicating a number of sets of preconfigured values in the plurality of sets of preconfigured values; and
   determining whether to apply a non-slot-based repetition scheme to perform the uplink transmission according to the DCI format and the RRC configuration,
   wherein the non-slot-based repetition scheme allows the UE to perform the uplink transmission and at least one repetition of the uplink transmission in a same slot.

2. The method of claim 1, wherein determining the number of times the uplink transmission is required to be repeated comprises:
   selecting, from the selected set of preconfigured values, a preconfigured value indicated by the DCI; and determining the number of times the uplink transmission is required to be repeated according to the selected preconfigured value.

3. The method of claim 1, wherein each of the plurality of sets of preconfigured values is mapped to a respective DCI format.

4. The method of claim 1, wherein the RRC configuration comprises a Bandwidth Part (BWP)-specific configuration that is dedicated to a specific BWP.

5. The method of claim 1, wherein each of the plurality of sets of preconfigured values is included in a respective Time Domain Resource Allocation (TDRA) list.

6. The method of claim 1, wherein the uplink transmission comprises a Physical Uplink Shared Channel (PUSCH) transmission.

7. A User Equipment (UE) that performs repetition transmissions, the UE comprising:
one or more non-transitory computer-readable media storing one or more computer-executable instructions; and
at least one processor coupled to the one or more non-transitory computer-readable media, and configured to execute the one or more computer-executable instructions to perform operations comprising:
receiving Downlink Control Information (DCI) scheduling an uplink transmission;
identifying a DCI format of the DCI;
selecting, from a plurality of sets of preconfigured values, a set of preconfigured values that is mapped to the DCI format;
determining a number of times the uplink transmission is required to be repeated from the selected set of preconfigured values;
receiving a Radio Resource Control (RRC) configuration indicating a number of sets of preconfigured values in the plurality of sets of preconfigured values; and
determining whether to apply a non-slot-based repetition scheme to perform the uplink transmission according to the DCI format and the RRC configuration,
wherein the non-slot-based repetition scheme allows the UE to perform the uplink transmission and at least one repetition of the uplink transmission in a same slot.

8. The UE of claim 7, wherein determining the number of times the uplink transmission is required to be repeated comprises:
selecting, from the selected set of preconfigured values, a preconfigured value indicated by the DCI; and
determining the number of times the uplink transmission is required to be repeated according to the selected preconfigured value.

9. The UE of claim 7, wherein each of the plurality of sets of preconfigured values is mapped to a respective DCI format.

10. The UE of claim 7, wherein the RRC configuration comprises a Bandwidth Part (BWP)-specific configuration that is dedicated to a specific BWP.

11. The UE of claim 7, wherein each of the plurality of sets of preconfigured values is included in a respective Time Domain Resource Allocation (TDRA) list.

12. The UE of claim 7, wherein the uplink transmission comprises a Physical Uplink Shared Channel (PUSCH) transmission.

* * * * *